United States Patent
Park

(10) Patent No.: US 12,035,219 B2
(45) Date of Patent: Jul. 9, 2024

(54) UNICAST PACKET ADDRESSING AND COMMUNICATION

(71) Applicant: QUALCOMM INCORPORATED, San Diego, CA (US)

(72) Inventor: Vincent Douglas Park, Alexandria, VA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/447,761

(22) Filed: Sep. 15, 2021

(65) Prior Publication Data

US 2022/0086730 A1 Mar. 17, 2022

Related U.S. Application Data

(60) Provisional application No. 63/079,283, filed on Sep. 16, 2020.

(51) Int. Cl.
*H04W 40/02* (2009.01)
*H04W 4/46* (2018.01)
*H04W 4/70* (2018.01)

(52) U.S. Cl.
CPC ............ *H04W 40/02* (2013.01); *H04W 4/46* (2018.02)

(58) Field of Classification Search
CPC ........ H04W 40/02; H04W 40/40; H04W 4/46
See application file for complete search history.

(56) References Cited

U.S. PATENT DOCUMENTS

| | | | | |
|---|---|---|---|---|
| 10,298,416 B2 * | 5/2019 | Ng | ........................... | H04L 12/18 |
| 10,423,358 B1 * | 9/2019 | Foo | ......................... | G06F 3/067 |
| 2001/0012296 A1 * | 8/2001 | Burgess | .............. | H04L 63/0236 370/392 |
| 2002/0141401 A1 * | 10/2002 | Albert | ................... | H04L 45/243 370/254 |
| 2003/0012190 A1 * | 1/2003 | Kaku | .................... | H04L 41/046 375/E7.267 |
| 2003/0185209 A1 * | 10/2003 | Lee | ........................ | H04L 45/12 370/392 |

(Continued)

FOREIGN PATENT DOCUMENTS

WO 2020087365 A1 5/2020

OTHER PUBLICATIONS

International Search Report and Written Opinion—PCT/US2021/050741—ISA/EPO—Dec. 20, 2021.

*Primary Examiner* — Jenee Holland

(74) *Attorney, Agent, or Firm* — Dalei Dong; Haynes and Boone, LLP

(57) ABSTRACT

Mechanisms for performing unicast packet addressing and communication, e.g., in a C-V2X sidelink communication scenario, are provided. In one aspect, a method for wireless communication performed by a first wireless communication device includes receiving a source identifier associated with a second wireless communication device, and determining, based on the source identifier associated with the second wireless communication device and a deterministic function, a destination identifier. The destination identifier is different from the source identifier. The method further includes generating a packet comprising the destination identifier, where the destination identifier indicates a unicast packet, and transmitting the unicast packet to the second wireless communication device.

29 Claims, 9 Drawing Sheets

(56) References Cited

U.S. PATENT DOCUMENTS

| | | | |
|---|---|---|---|
| 2004/0076158 A1* | 4/2004 | Okubo | H04L 45/00 370/392 |
| 2007/0008972 A1* | 1/2007 | Sifnatsch | H04L 45/00 370/392 |
| 2009/0103542 A1* | 4/2009 | Wentink | H04W 28/06 370/393 |
| 2013/0072245 A1* | 3/2013 | Lee | H04W 4/70 455/517 |
| 2015/0189647 A1* | 7/2015 | Poggi | H04B 7/2656 370/336 |
| 2015/0257187 A1* | 9/2015 | Kwon | H04W 72/04 370/329 |
| 2016/0302247 A1* | 10/2016 | Lu | H04W 8/005 |
| 2017/0034862 A1* | 2/2017 | Ma | H04W 76/14 |
| 2017/0289031 A1* | 10/2017 | Duda | H04L 12/4633 |
| 2018/0365909 A1 | 12/2018 | Cheng et al. | |
| 2019/0281495 A1* | 9/2019 | Wu | H04L 45/66 |
| 2020/0084592 A1* | 3/2020 | Gulati | H04W 4/12 |
| 2020/0314953 A1* | 10/2020 | Lin | H04W 72/56 |
| 2021/0212104 A1 | 7/2021 | Li et al. | |

* cited by examiner

UNICAST PACKET ADDRESSING AND COMMUNICATION

CROSS-REFERENCE TO RELATED APPLICATIONS

The present application claims the benefit of and priority to U.S. Provisional Application No. 63/079,283, filed Sep. 16, 2020, the entirety of which is incorporated by reference.

TECHNICAL FIELD

This application relates to wireless communication devices, systems, and methods, and more particularly to devices, systems, and methods for transmitting unicast packets using cellular vehicle-to-everything (C-V2X) communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. In some instances, a UE may communicate with one or more other UEs via a sidelink communication. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

In some aspects, it may be desirable for wireless nodes to be able to communicate without communicating through a BS and/or core network. Cellular sidelink communication schemes provide for communication between two or more wireless nodes using some of the wireless protocols of cellular networks, such as LTE and/or 5G NR. For example, cellular vehicle-to everything (C-V2X) communications, including vehicle-to-vehicle (V2V), vehicle-to-infrastructure (V2I), vehicle-to-pedestrian (V2P), and/or vehicle-to-cloud (V2C) communications, can allow for vehicles to communicate with other vehicles and/or infrastructure nodes, such as traffic signals and signs, without communicating through a BS. To transmit a packet using C-V2X, a data link layer of a wireless node can generate a header including a source identifier and a destination identifier. The destination identifier is associated with the destination or recipients of the packet. Typically, C-V2X packets are broadcast or multicast to multiple wireless nodes within a transmission range of the transmitting node. One example of a C-V2X multicast transmission is a basic safety message (BSM) that communicates position, heading, speed, safety alerts, and/or other information to other devices (e.g., vehicles) within a range of the transmitting node/vehicle. Other multicast transmissions may include traffic information messages (TIMs), signal phase and time (SPAT) messages, cooperative awareness messages (CAMs), distributed environment notification messages (DENMs), in-vehicle information (IVI) messages, and/or any other multicast messages. It will be understood that this list of multicast transmissions is not exclusive and that other types of multicast transmissions/messages are contemplated by the present disclosure.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present application describes mechanisms for performing unicast packet transmissions in a C-V2X sidelink communication scenario. In one aspect, a transmitting wireless node may generate a packet for transmission to a receiving wireless node, the packet including a destination identifier. The destination identifier may be generated based on a source identifier associated with the receiving node, and a deterministic function. The deterministic function may be used such that the destination identifier indicates whether the packet is a unicast packet or a multicast packet. The recipient C-V2X node monitors for incoming packets that include the destination identifier indicating whether the packet is a unicast packet, and passes the packet to higher layers of the node for processing.

According to one aspect of the present disclosure, a method for wireless communication performed by a first wireless communication device includes: receiving a source identifier associated with a second wireless communication device; determining, based on the source identifier associated with the second wireless communication device and a deterministic function, a destination identifier, wherein the destination identifier is different from the source identifier; generating a packet comprising the destination identifier, wherein the destination identifier indicates a unicast packet; and transmitting the packet to the second wireless communication device.

According to another aspect of the present disclosure, a method for wireless communication performed by a first wireless communication device includes: determining, based on a source identifier associated with the first wireless communication device and a deterministic function, a destination identifier associated with the first wireless communication device, wherein the destination identifier is different from the source identifier; receiving a packet from a second wireless communication device; and determining whether the packet is a unicast packet based on whether the packet comprises the destination identifier. In some aspects, determining whether the packet is a unicast packet includes determining whether the packet is a unicast packet intended for the first wireless communication device.

According to another aspect of the present disclosure, a first wireless communication device includes: a transceiver configured to: receive a source identifier associated with a second wireless communication device; and a processor in communication with the processor, the transceiver configured to: determine, based on the source identifier associated with the second wireless communication device and a deterministic function, a destination identifier, wherein the destination identifier is different from the source identifier; and generate a packet comprising the destination identifier, wherein the destination identifier indicates a unicast packet, and wherein the transceiver is further configured to: transmit the packet to the second wireless communication device.

According to another aspect of the present disclosure, a first wireless communication device includes: a processor configured to: determine, based on a source identifier associated with the first wireless communication device and a deterministic function, a destination identifier associated with the first wireless communication device, wherein the destination identifier is different from the source identifier; and a transceiver configured to: receive a packet from a second wireless communication device, wherein the processor is further configured to: determine whether the packet is a unicast packet based on whether the packet comprises the destination identifier.

According to another aspect of the present disclosure, a non-transitory computer-readable medium has program code recorded thereon for wireless communication by a first wireless communication device. The program code includes: code for causing the first wireless communication device to receive a source identifier associated with a second wireless communication device; code for causing the first wireless communication device to determine, based on the source identifier associated with the second wireless communication device and a deterministic function, a destination identifier, wherein the destination identifier is different from the source identifier; code for causing the first wireless communication device to generate a packet comprising the destination identifier, wherein the destination identifier indicates a unicast packet; and code for causing the first wireless communication device to transmit the packet to the second wireless communication device.

According to another aspect of the present disclosure, a non-transitory computer-readable medium has program code recorded thereon for wireless communication by a first wireless communication device. The program code includes: code for causing the first wireless communication device to determine, based on a source identifier associated with the wireless communication device and a deterministic function, a destination identifier associated with the first wireless communication device, wherein the destination identifier is different from the source identifier; code for causing the first wireless communication device to receive a packet from a second wireless communication device; and code for causing the first wireless communication device to determine whether the packet is a unicast packet based on whether the packet comprises the destination identifier.

According to another aspect of the present disclosure, a first wireless communication device includes: means for receiving a source identifier associated with a second wireless communication device; means for determining, based on the source identifier associated with the second wireless communication device and a deterministic function, a destination identifier, wherein the destination identifier is different from the source identifier; means for generating a packet comprising the destination identifier, wherein the destination identifier indicates a unicast packet; and means for transmitting the packet to the second wireless communication device.

According to another aspect of the present disclosure, a first wireless communication device includes: means for determining, based on a source identifier associated with the first wireless communication device and a deterministic function, a destination identifier associated with the first wireless communication device, wherein the destination identifier is different from the source identifier; means for receiving a packet from a second wireless communication device; and means for determining whether the packet is a unicast packet based on whether the packet comprises the destination identifier.

Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
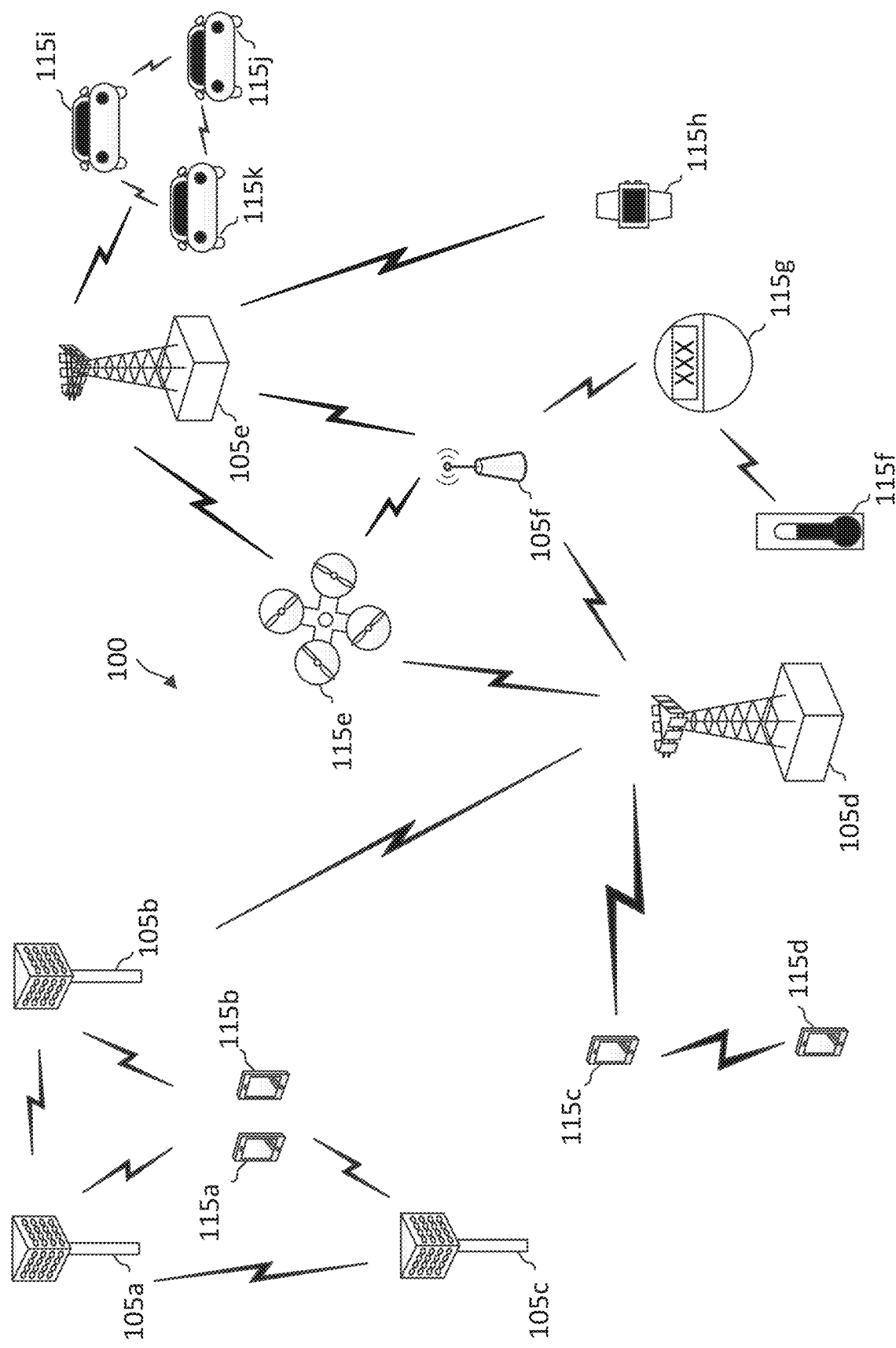
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond, and in particular to the development of sidelink communication mechanisms in C-V2X communication scenarios.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As explained above, cellular vehicle-to everything (C-V2X) communications, including vehicle-to-vehicle (V2V), vehicle-to-infrastructure (V2I), vehicle-to-pedestrian (V2P), and/or vehicle-to-cloud (V2C) communications, allow for vehicles to communicate with other vehicles and/or infrastructure nodes, such as traffic signals and signs, without communicating through a BS. To transmit a packet using C-V2X, a data link layer (e.g., media access control (MAC) layer) of a wireless node generates a header including a source identifier and a destination identifier. The source identifier indicates an address of the source (e.g., transmitting node) of the packet. The destination identifier indicates an address of intended recipient(s) of the packet. Typically, C-V2X packets are broadcast or multi-cast to multiple wireless nodes within a transmission range of the transmitting node. Other wireless nodes within range of the transmitting node receive the multicast packet and determine whether to pass the packet to higher layers (e.g., network layer) for further processing.

In some instances, it may be desirable to perform a unicast transmission to a single wireless node in a C-V2X communication scenario, rather than a multicast transmission. For example, it may be desirable for a wireless node to send and/or receive unicast messages for toll collection with a single vehicle, rather than all vehicles within range. In some sidelink communications, a version field of a packet header may be used to indicate whether the packet has a unicast destination (single intended recipient) or a multicast destination (multiple intended recipients/indiscriminate). However, in some C-V2X communication scenarios, it may not be possible or practical to use the version field to indicate whether a packet is intended for unicast transmission. Accordingly, in some C-V2X communication scenarios, it may not be possible for other nodes to receive unicast transmissions, or to distinguish between unicast and multicast transmissions.

The present disclosure describes methods, mechanisms, and algorithms for unicast and multicast transmissions in a C-V2X communication scenario. Aspects of the present disclosure include generating destination identifiers that indicate whether a packet has a unicast destination or a multicast destination. In one aspect, a wireless node is configured to generate a destination identifier based on a source identifier of the intended recipient node and a deterministic function such as a bit masking operation, a static mapping operation, or a hash operation. The resulting destination identifier may have a modified structure with a first portion indicating whether the packet has a unicast destination or a multicast destination, and a second portion indicating the intended recipient(s). In another aspect, the deterministic function may divide the number of possible values of the destination identifier into a unicast group and a multicast group. In another aspect of the present disclosure, a wireless node may indicate whether a packet has a unicast destination or a multicast destination by modifying the structure of the source identifier, instead of or in addition to the destination identifier.

Aspects of the present disclosure advantageously provide for unicast and multicast packet transmissions while making minimal changes to the packet header structure and the higher layers of the protocol stack. Aspects of the present disclosure can allow for more efficient use of network resources and/or reduce network congestion by facilitating unicast and multicast transmissions. Further, devices can discard or ignore any unicast packets intended for another device, saving processing time and resources of the devices.

FIG. 1 illustrates a wireless communication network 100 according to some aspects of the present disclosure. The network 100 may be a 5G network, an LTE network, or any suitable cellular network and/or combinations thereof. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for sidelink communication, and for access to the network 100. A UE 115 may be able to communicate with other UEs 115 or wireless nodes, or any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, V2P, and/or C-V2X communications between a UE 115i, 115j, or 115k and other UEs 115, and/or vehicle-to-infrastructure (V2I) communications between a UE 115i, 115j, or 115k and one or more other wireless nodes, including through the use of sidelink communications in accordance with the present disclosure. Additional details for sidelink communications suitable for V2V, V2X, V2P, C-V2X, and/or V2I communications will be described further below with respect to FIGS. 3-6.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 (or UEs 115 or other wireless nodes, in sidelink communication scenarios) can assign or schedule transmission resources (e.g., in the form of time-frequency resource blocks (RB)) for downlink (DL) and uplink (UL) transmissions (or sidelink transmissions). DL may refer to the transmission direction from a BS 105 to a UE 115, whereas UL may refer to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 (or another UE or wireless node) to estimate a UL channel (or sidelink channel). Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 (or UEs 115 in sidelink communication) can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105 or from another wireless node in the network (e.g., another UE 115 in sidelink communication). The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Although much of the description of the network 100 above is in the context of communication between UEs 115 and BSs 105, it will be understood that the mechanisms, elements, structures, and protocols described above can be performed between UEs 115 or wireless nodes in a sidelink communication scenario, such as C-V2X communication. For example, in some aspects, the radio frame structures, channels, signals, scheduling procedures, and/or connection techniques (e.g., HARQ) may be performed between UEs 115/wireless nodes, rather than between a BS 105 and a UE 115.

Sidelink communications refers to the communications among user equipment devices (e.g., UEs 115*i*, 115*j*, 115*k*) without tunneling through a BS 105 and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS 105 and a UE 115, as described above. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

Figure 2:
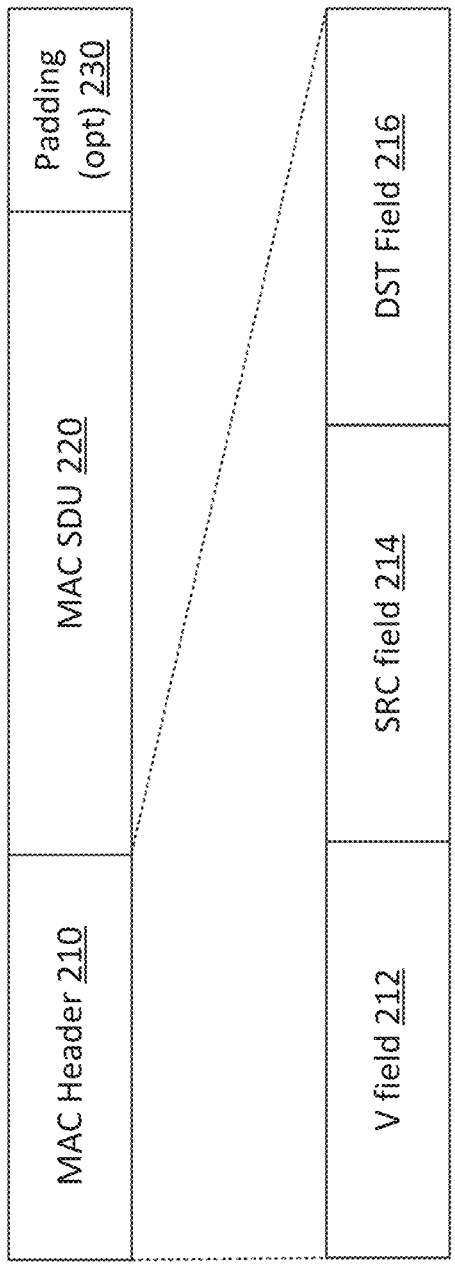
FIG. 2 is a diagram illustrating a data link layer frame structure according to some aspects of the present disclosure

FIG. 2 is a diagram illustrating a structure of a packet or frame 200 according to some aspects of the present disclosure. Packets having the structure illustrated in FIG. 2 may be transmitted and/or received by wireless nodes in a sidelink communication scenario, such as a C-V2X communication scenario. The structure of the packet 200 may be set and/or used by a data link layer or sublayer of a wireless node, such as a media access control (MAC) sublayer. In the illustrated embodiment, the packet 200 comprises a MAC protocol data unit (PDU) 205. The PDU 205 includes a MAC header 210, a MAC service data unit (SDU), and an optional padding portion 230. In some aspects, the MAC header 210 is generated or set by the MAC layer, and includes information associated with the source of the packet 200, the destination or address of the packet 200, and a version or type of the MAC header 210. In this regard, the MAC header 210 includes a V field (header version), an SRC (source) field 214, and a DST (destination) field 216. However, it will be understood that the fields illustrated in FIG. 2 are exemplary and that a MAC header may include other fields in addition to those specifically illustrated and described with respect to FIG. 2.

The V field corresponds to a MAC PDU format version number, and indicates a version of a SL-SCH subheader being used. In some aspects, the V field 212 may include four bits. In some aspects, the value set for the V field 212 may indicate a size (e.g., in bits) of the DST field 216. For example, in some aspects, a first value of the V field 212 may indicate that the DST field 216 has 16 bits, and a different second value for the V field 212 indicates that the DST field 216 has 24 bits. However, other sizes/numbers of bits for the V field 212 and/or DST field 216 are also contemplated by the present disclosure.

The SRC field 214 carries a source identifier, which indicates the identity of the source of a packet. The SRC field 214 may be randomly assigned, in some aspects. In an exemplary aspect, the source identifier includes 24 bits. In another aspect, the SRC field 214 may be defined as a Source Layer-2 ID field, and the source identifier may be set to the ProSe UE ID. In some aspects, random assignment of the source identifier may provide for some privacy (e.g., anonymity) and also uniformity in a sidelink communication scenario such that the chances of any two or more nodes having the same source identifier value are minimized. However, the source identifier may be non-randomly assigned by a wireless node based on an address specifically allocated to the node, e.g., by an appropriate management authority.

The DST field 216 carries a destination identifier, which indicates the destination of a packet. In some aspects, the destination of the packet may be a multicast destination or a unicast destination. For example, a program or application may assign a multicast destination identifier to the DST field 216, which may allow the packet to be received and deciphered by any node(s) within range of the multicast transmission that are configured by the program or application to receive (e.g., monitor for) the multicast destination identifier. In another example, a packet may be configured for unicast transmission to an individual node, as indicated by the destination identifier. In some sidelink communication scenarios, a unicast transmission may involve setting the destination identifier value to the source identifier of the desired recipient. Further, in some aspects, the version identifier of the V field 212 may not allow a distinction between multicast and unicast packet transmissions for a given size of a destination identifier (e.g., 24 bits). However, in some aspects, it may be advantageous to indicate whether a packet is associated with a unicast transmission or a multicast transmission such that unicast transmission can occur in a sidelink communication scenario, particularly when the unicast transmission type cannot be indicated in other fields of the MAC header 210 (e.g., the V field 212). As explained further below, the present disclosure provides methods, algorithms, and mechanisms for indicating a unicast destination based on destination identifiers generated using one or more deterministic functions.

In some aspects, the destination identifier carried by the DST field 216 includes 24 bits. However, other numbers of bits/values are also contemplated, both greater and smaller. In some aspects, the DST field 216 may be defined as a Destination Layer-2 ID field, and the source identifier may be set to the ProSe UE ID, or the ProSe Layer-2 Group ID.

The MAC service data unit (MAC SDU) 220 may carry a packet or frame from a higher layer, such as a network layer. Accordingly, when a node receives a MAC PDU 205, the MAC layer may receive the packet based on the information provided in the MAC header 210, and forward the MAC SDU 220 to the higher layer (e.g., radio link control (RLC) layer) for further processing.

In some aspects, the MAC PDU 205 is incorporated into a lower level packet, such as a physical layer frame. For example, the MAC PDU 205 may be packaged into a physical service data unit (PSDU) for transmission over the physical layer of the network or communication scheme, such as LTE V2X. Further, it will be understood that that the MAC PDU 205, which may also be referred to as a frame, may carry or include a packet from a higher layer in the protocol stack, such as a radio link control (RLC) packet.

Figure 3:
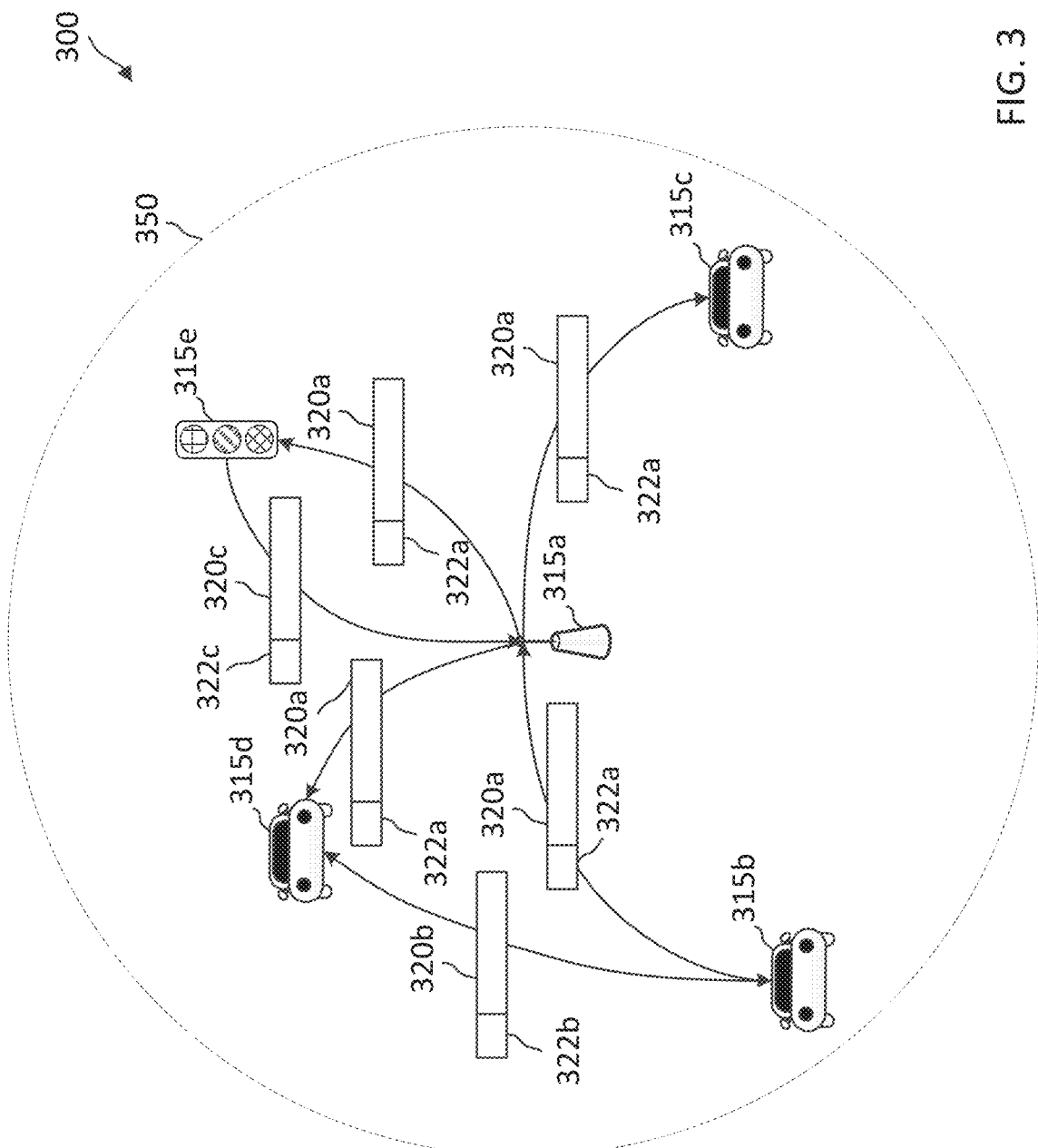
FIG. 3 illustrates a cellular vehicle-to-everything (C-V2X) sidelink communication scenario according to some aspects of the present disclosure.

FIG. 3 is a diagram illustrating a C-V2X communication scenario 300, according to aspects of the present disclosure. In an exemplary aspect, the C-V2X communication scenario 300 is an LTE V2X communication scenario. As illustrated, the scenario 300 includes a plurality of nodes 315 or wireless communication devices performing various types of sidelink communications. For example, the communication scenario 300 may include unicast and/or multicast communications, including groupcast and/or broadcast communications. Each communication may include a transmission of a frame or packet 320 and a header 322 associated with the packet 320. In an exemplary aspect, the packet 320 is a MAC SDU, such as the MAC SDU 220, and the header is a MAC header, such as the MAC header 210 illustrated in FIG. 2. However, frames, packets, and/or PDUs of other types/layers are also contemplated.

In one aspect, a first node 315a performs a multicast transmission in which a first packet 320a associated with a first header 322a is multicasted to multiple vehicle nodes, including 315b, 315c, 315d, and a traffic light node 315e. In particular, the first node 315a broadcasts the first packet 320a to all other nodes 315b, 315c, 315d, 315e within the range 350 of the first node 315a. In some embodiments, the header 322a associated with the first packet 320a includes a source identifier associated with the first node 315a, and a destination identifier associated with the nodes of a particular group (e.g., groupcast), or a broadcast destination identifier (e.g., 0xFFFFFF). The destination identifier in the packet header 322a may be provided by an application running on the first node 315a and/or other nodes in a group. For example, the application may configure the nodes 315b, 315c, 315d, 315e to monitor for incoming packets or frames having the destination identifier set by the application running on the first node 315a. Accordingly, the destination identifier may not indicate a unique, or individual destination value, but a group-based destination value. However, it will be understood that, in some instances, a multicast packet may be received by only one other node, or by no nodes. For example, in some instances, there may be only one other node within the range 350 of the first node 315a that is configured to monitor for packets having a particular multicast destination identifier. Accordingly, it will be understood that the type of a transmission (e.g., unicast or multicast) does not necessarily indicate the number of recipients, but rather indicates a scope of transmission and potential recipients within the range 350.

Referring still to FIG. 3, vehicle node 315b performs a unicast transmission of a second packet 320b associated with a second header 322b to vehicle node 315d. The second header 322b includes a source identifier associated with vehicle node 315b, and a destination identifier associated with the recipient vehicle node 315d. In some aspects, the header 322b may indicate that the second packet 320b is of a unicast transmission type, and identifies the unicast recipient. In an exemplary aspect, the destination identifier may indicate that the second packet 320b has a unicast destination. In one aspect, the recipient vehicle node 315d is configured to monitor for packets with a destination identifier indicating a unicast destination corresponding to its own source identifier. For example, as explained further below, the vehicle node 315d may determine a unicast destination identifier for itself based on its own source identifier and a deterministic function, and monitor for packets having the unicast destination identifier. If the node 315d determines that the packet 320b includes the unicast destination identifier, the node 315d forwards the packet to the higher layer(s) in the protocol stack for processing. If the node 315d determines that the packet 320b does not include the unicast destination identifier, and also does not include any other destination identifiers (e.g., application-assigned multicast destination identifiers) for which the node 315d is monitoring, the node 315d discards the packet 320b.

In another aspect, a traffic light node 315e performs a unicast transmission of a third frame 320c associated with a third header 322c to the first node 315a. In some aspects, the traffic light node 315e may determine a destination identifier for the unicast packet based on receiving the broadcast packet 320a. Since the broadcast packet 320a includes the source identifier of the first node 315a, the traffic light node 315e may determine a destination identifier for the first node 315a using the source identifier of the first node 315a and a deterministic function to indicate the unicast transmission type, as further explained below.

Figure 4:
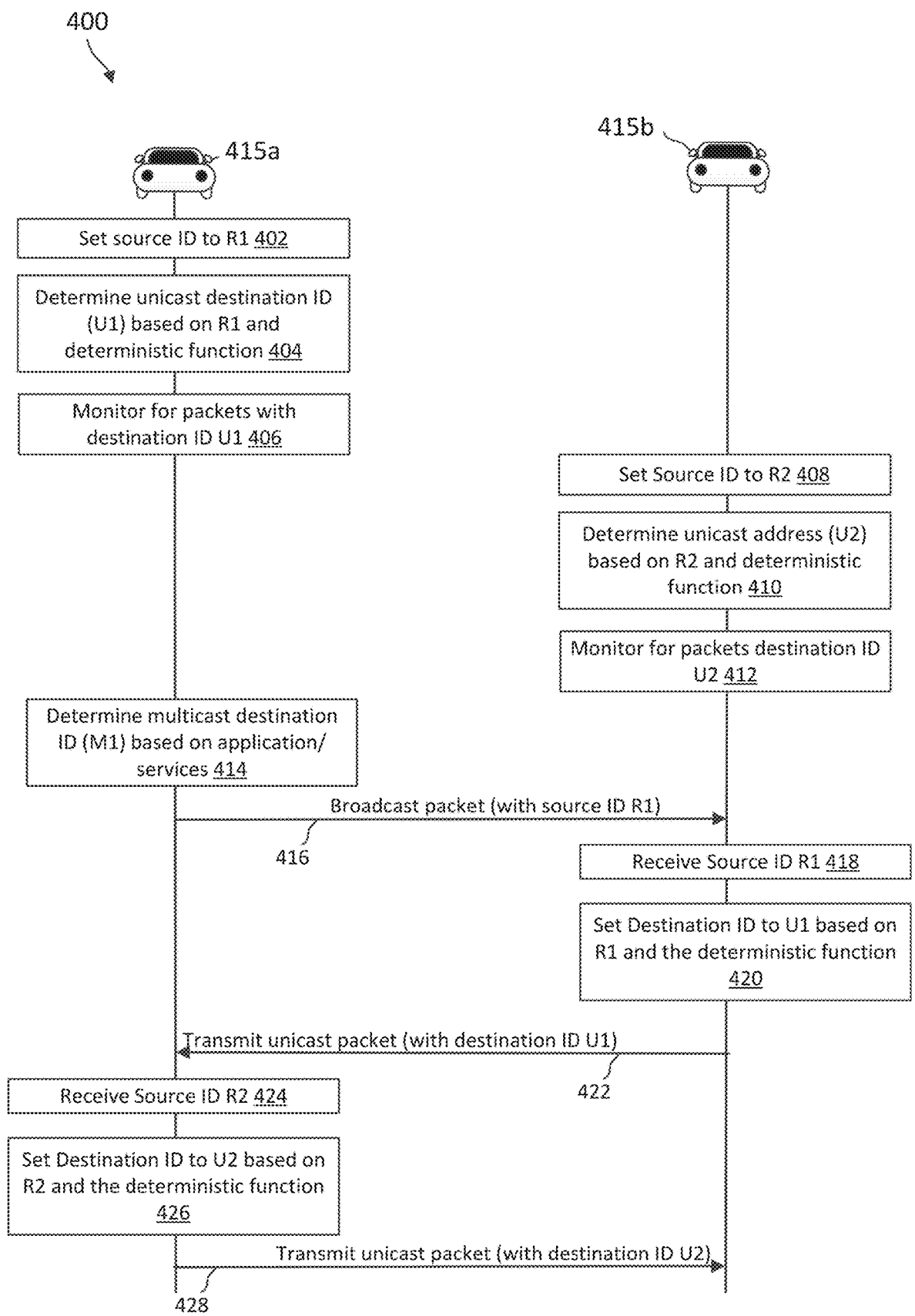
FIG. 4 is a signaling diagram illustrating a C-V2X sidelink communication scenario including unicast and multicast packet transmissions according to some aspects of the present disclosure.

FIG. 4 is a signaling diagram illustrating a method 400 for unicast sidelink communication in a C-V2X communication scenario between a first node 415a and a second node 415b, according to some aspects of the present disclosure. The nodes 415a and 415b may be the UEs 115 (e.g., 115i, 115j, 115k) in the network 100 of FIG. 1, or any of the wireless nodes 315 in the C-V2X communication scenario 300 of FIG. 3. Steps of the method 400 can be executed by computing devices (e.g., a processor, processing circuit, and/or other suitable component) of the nodes 415a, 415b. The steps of the method 400 may be performed at a data link layer or sublayer of wireless nodes 415a, 415b, such as the MAC layer. However, other layers/sublayers may also be involved in the steps of the method 400, including the physical layer. As illustrated, the method 400 includes a number of enumerated steps, but aspects of the method 400 may include additional steps before, after, and in between the enumerated steps. In some aspects, one or more of the enumerated steps may be omitted or performed in a different order.

In block 402, the first node 415a sets a source identifier to a random value RE In some aspects, setting the source identifier may include setting a Source Layer-2 ID value to the random value R1. The source identifier may be carried in an SRC field of a packet header, such as a MAC PDU header. In one aspect, the source identifier comprises a 24-bit value. However, other size source identifiers are also contemplated, including 16 bits, 20 bits, 36 bits, 48 bits, or any other suitable number of bits, both greater or smaller.

In block 404, the first node 415a determines a destination identifier U1 associated with the first node 415a based on the source identifier R1 and a deterministic function. The destination identifier U1 may be the destination identifier that is expected to be used for unicast transmissions intended for the first node 415a. In one aspect, the deterministic function includes a bit masking operation, and determining the destination identifier U1 includes applying a bit mask to the source identifier R1 set in block 402. Determining the destination identifier U1 using a bit masking operation will be explained further below with respect to FIG. 6. In some aspects, the number of distinct values that can be represented by U1 is less than the number of distinct values that can be represented by the source identifier determined in block 402. In other aspects, the deterministic function may include a static mapping operation and/or a hash operation. For example, a static mapping operation may involve a many-to-one correspondence between a source identifier and a destination identifier associated with a unicast transmission type. The static mapping operation may include using a lookup table to determine the destination identifier based on the source identifier of the receiving node. A hash operation may involve mapping a first value to another value of a fixed size using a hash function. In some aspects, the configuration information for the deterministic function used in block 404 may include a bit masking configuration, a lookup table for a static mapping operation, and/or a hash function, and may be defined in a specification or standard, coded or pre-previsioned in devices prior to deployment, and/or communicated to devices via various means.

In block 406, the first node 415a monitors for packets having the destination identifier U1, which was determined in block 404. By determining the unicast destination identifier U1 for itself, the first node 415a can identify a unicast packet intended for the first node 415a.

In block 408, the second node 415b sets its source identifier to a random value R2, similar to block 402. In some aspects, setting the source identifier R2 may include setting a Source Layer-2 ID value to a random value. The source identifier may be carried in an SRC field of a packet header, such as a MAC PDU header. In one aspect, the source identifier comprises a 24-bit value. However, other size source identifiers are also contemplated, including 16 bits, 20 bits, 36 bits, 48 bits, or any other suitable number of bits, both greater or smaller.

In block 410, the second node 415b determines a destination identifier U2 for a unicast transmission associated with the first node 415a based on the source identifier R2 and a deterministic function. The second node 415b may determine the destination identifier U2 similarly to the determination of the destination identifier U1 by the first node 415a. For example, in one aspect, the deterministic function includes a bit masking operation, and determining the destination identifier U2 includes applying a bit mask to the source identifier R2 set in block 408. Determining the destination identifier U2 using a bit masking operation will be explained further below with respect to FIG. 6. In some aspects, the number of distinct values that can be represented by U2 is less than the number of distinct values that can be represented by the source identifier determined in block 408. In other aspects, the deterministic function may include a static mapping operation and/or a hash operation.

In block 412, the second node 415b monitors for packets having the destination identifier U2, which was determined in block 410. By determining the unicast destination identifier U2 for unicast packets that will be received by the second node 415b, the second node 415b can identify a unicast packet intended for the second node 415b.

In block 414, the first node 415a determines a multicast destination identifier M1 for a multicast packet transmission. In some aspects, the multicast packet transmission may be a broadcast transmission and/or a groupcast transmission. In one aspect, the multicast destination identifier M1 is determined or set based on an application running on the first node 415a. For example, the application may specify that a packet, which may include a basic safety message, for example, will be broadcast to all nodes within the range of the first node 415a, and sets the destination identifier M1 accordingly.

In action 416, the first node broadcasts the packet using the multicast destination identifier M1 and the source identifier R1. Accordingly, the broadcast packet may be received by any node within a range of the first node 415a that is configured to receive/monitor for packets having the multicast destination identifier M1. In an exemplary aspect, the broadcasting of the packet is performed by a physical layer of a sidelink communication scheme, such as a C-V2X scheme. In particular, the broadcasting of the packet may be performed by the physical layer of an LTE-V2X communication scheme.

In block 418, the second node 415b receives the broadcast packet including the source identifier R1 from the first node 415a. In some aspects, block 418 may include determining whether the second node 415b has been configured to monitor for the destination identifier M1. The second node 415b may be configured to pass the packet up to a higher layer (e.g., network layer) in the protocol stack for further processing if the second node 415b has been configured to monitor for the destination identifier M1, and to discard packets having destination identifiers that the second node 415b has not been configured to monitor.

If/when the second node 415b has a packet to unicast to the first node 415a, the second node 415b sets a destination identifier for the packet to U1 in block 420. The destination identifier U1 is set based on the source identifier R1 of the first node 415a received in block 418, and a deterministic function. As explained above, the deterministic function may include a bit masking operation, a static mapping operation, and/or a hash operation. The deterministic function may modify the source identifier value R1 such that the destination identifier U1 resulting from the deterministic function indicates whether the packet is a unicast transmission or a multicast transmission.

In action 422, the second node 415b unicasts the packet having the destination identifier U1 and a source identifier R2 to the first node 415a. In an exemplary aspect, the transmission of the packet is performed by a physical layer of a sidelink communication scheme, such as a C-V2X scheme. In particular, the transmission of the packet may be performed by the physical layer of an LTE-V2X communication scheme.

In block 424, the first node 415a receives the unicast packet having the destination identifier U1 and the source identifier R2. The first node 415a, which was configured to monitor for U1 in block 406, identifiers that the packet is a unicast packet intended for the first node 415a based on the destination identifier U1. Accordingly, the first node 415a may cause the packet to be passed to higher layers of the first node 415a for further processing. By contrast, if the packet did not include the destination identifier U1, and also did not include any multicast destination identifier the first node 415a is configured to monitor, the first node 415a would discard the packet.

In block 426, if/when the first node 415a has a packet for unicast transmission to the second node 415b, the first node 415a sets a unicast destination identifier for the packet to U2 based on the source identifier R2 of the second node 415b, which was received in block 424, and the deterministic function. As explained above, the deterministic function may include a bit masking operation, a static mapping operation, and/or a hash operation. The deterministic function may modify the source identifier value R2 such that the destination identifier U2 resulting from the deterministic function indicates whether the packet is a unicast transmission or a multicast transmission.

In action 428, the first node 415a transmits the unicast packet to the second node 415b using the unicast destination identifier U2 and the source identifier R1. In an exemplary aspect, the transmission of the unicast packet is performed by a physical layer of a sidelink communication scheme, such as a C-V2X scheme. In particular, the transmission of the packet may be performed by the physical layer of an LTE-V2X communication scheme.

Accordingly, the nodes 415a, 415b can utilize the resources (e.g., bits) of the destination identifiers to indicate not only the address or destination of the packet, but whether the packet is a unicast packet or a multicast packet. Thus, the nodes 415a, 415b can determine whether a given packet is either a unicast packet or a multicast packet, and if a unicast packet can further determine whether the receiving node is the intended destination.

Figure 5:
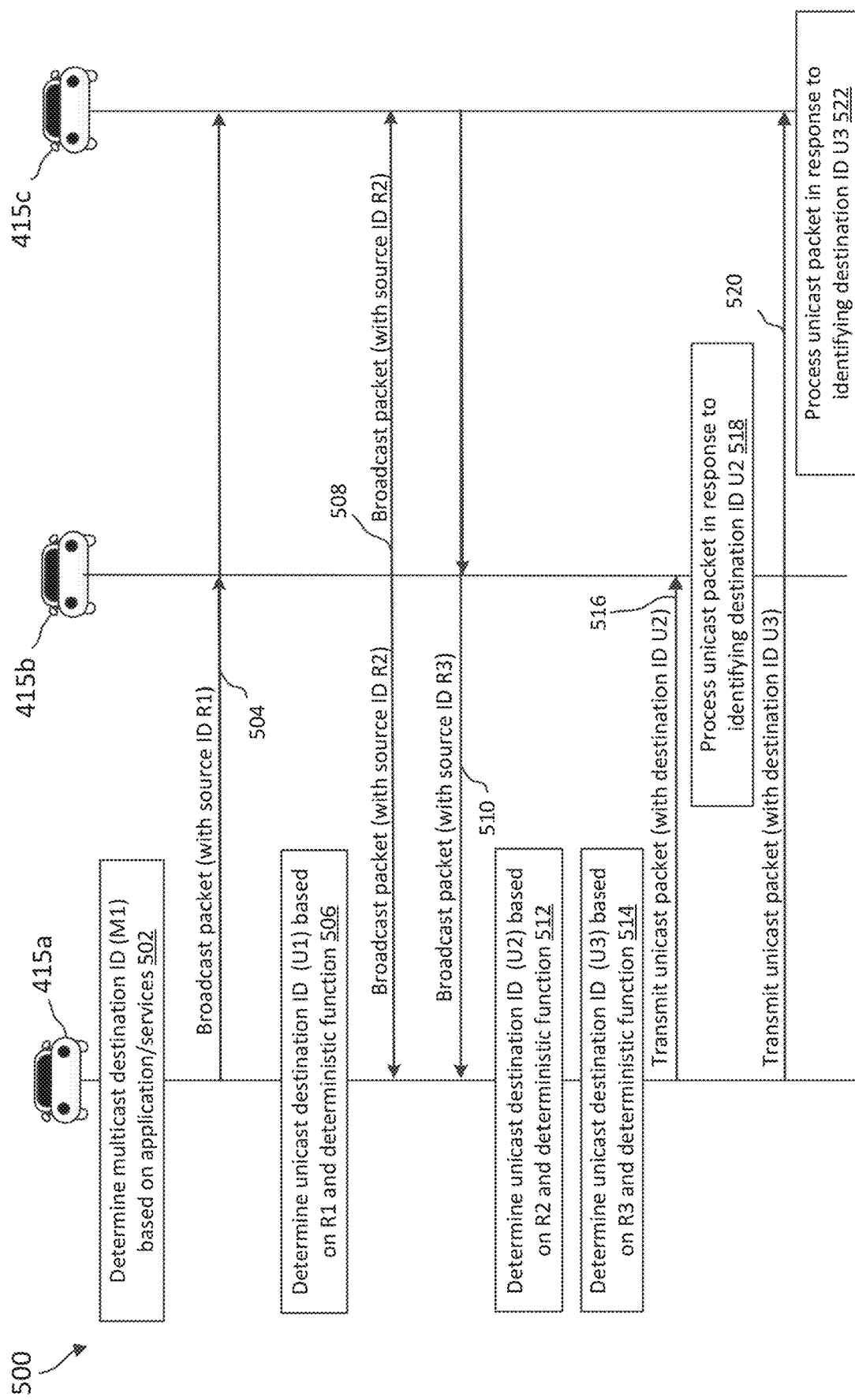
FIG. 5 is a signaling diagram illustrating a C-V2X sidelink communication scenario including unicast and multicast packet transmissions according to some aspects of the present disclosure.

FIG. 5 is a signaling diagram illustrating a mechanism for unicast sidelink communication in a C-V2X communication scenario between the first node 415a, the second node 415b, and a third node 415c, according to some aspects of the present disclosure. The nodes 415a, 415b may be the same nodes 415a, 415b described above with respect to FIG. 4. The nodes 415a, 415b, 415c, may be any of the UEs 115 (e.g., 115i, 115j, 115k) in the network 100 of FIG. 1, or any of the wireless nodes 315 in the C-V2X communication scenario 300 of FIG. 3. Steps of the method 500 can be executed by computing devices (e.g., a processor, processing circuit, and/or other suitable component) of the nodes 415a, 415b, 415c. The steps of the method 500 may be performed at a data link layer or sublayer of wireless nodes 415a, 415b, 415c, such as the MAC layer. However, other layers/sublayers may also be involved in the steps of the method 500, including the physical layer. As illustrated, the method 500 includes a number of enumerated steps, but aspects of the method 500 may include additional steps before, after, and in between the enumerated steps. In some aspects, one or more of the enumerated steps may be omitted or performed in a different order than what is shown.

The method 500 may include steps similar or identical to the steps of the method 400. In some aspects, the steps of the method 500 illustrates unicast transmissions by a first node 415a to multiple nodes, such as nodes 415b and 415c. Further, the steps of the method 500 may illustrate the use of broadcast and unicast transmissions in a C-V2X communication scenario between different nodes 415. The method 500 further illustrates packet receipt and processing by a receiving node to determine whether to process or discard a received packet.

In block 502, the first node 415a determines a destination identifier (M1) for a multicast transmission. In some aspects, the multicast transmission may be a broadcast transmission and/or a groupcast transmission. In one aspect, the multicast destination identifier M1 is determined or set based on an application running on the first node 415a. For example, the application may specify that a packet, which may include a basic safety message, for example, will be broadcast to all nodes within the range of the first node 415a, and sets the destination identifier M1 accordingly.

In action 504, the first node 415a broadcasts the packet, which is received by the second node 415b and the third node 415c.

In block 506, the first node 415a determines a unicast destination identifier U1 based on a source identifier for the first node 415a (e.g., the source identifier R1 set in block 402 of the method 400) and a deterministic function. In one aspect, the deterministic function includes a bit masking operation, and determining the destination identifier U1 includes applying a bit mask to the source identifier. Determining the destination identifier U1 using a bit masking operation will be explained further below with respect to FIG. 6. In some aspects, the number of distinct values that can be represented by U1 is less than the number of distinct values that can be represented by the source identifier. In other aspects, the deterministic function may include a static mapping operation and/or a hash operation.

In action 508, the second node 415b broadcasts a packet, which is received by the first node 415a and third node 415c. The packet includes a source identifier R2 associated with the second node 415b. As explained above, the source identifier R2 may be randomly generated/assigned by the second node 415b. In some aspects, the source identifier may comprise a 24 bit value. However, it will be understood that the source identifier may comprise other sizes without departing from the scope of the present disclosure, including 16 bits, 20 bits, 32 bits, 48 bits, or any other suitable value, both greater or smaller. The packet also includes a multicast destination identifier such that multiple nodes, or all nodes, within the range of the second node 415b are configured to receive the packet.

In action 510, the third node 415c broadcasts a packet, which is received by the first node 415a and second node 415b. The packet includes a source identifier R3 associated with the third node 415c. As explained above, the source identifier R3 may be randomly generated/assigned by the third node 415c. In some aspects, the source identifier may comprise a 24 bit value. However, it will be understood that the source identifier may comprise other sizes without departing from the scope of the present disclosure, including 16 bits, 20 bits, 32 bits, 48 bits, or any other suitable value, both greater or smaller. The packet also includes a multicast destination identifier such that multiple nodes, or all nodes, within the range of the third node 415c are configured to receive the packet.

In block 512, if/when the first node 415a has a packet for unicast transmission to the second node 415b, the first node 415a determines a unicast destination identifier U2 based on the source identifier R2 and a deterministic function. The source identifier R2 was transmitted to the first node 415a in action 508 and received by the first node 415b.

In block 514, if/when the first node 415a has a packet for unicast transmission to the third node 415c, the first node 415a determines a unicast destination identifier U3 based on the source identifier R3 and a deterministic function. The source identifier R3 was transmitted to the first node 415a in action 510 and received by the first node 415a.

In action 516, the first node 415a transmits a unicast packet having the destination identifier U2 determined in block 512 to the second node 415b.

In block 518, the second node 415b receives and processes the unicast packet in response to identifying the destination identifier U2. In this regard, the second node 415b may be configured to monitor for incoming packets having the destination identifier U2. If the destination identifier of the received packet is equal to U2, the second node 415b passes the packet to higher layer(s) of the protocol stack (e.g., RLC layer) for further processing. If the destination identifier of the received packet is not equal to U2, and is not equal to any other unicast or multicast destination identifiers that the second node 415b is monitoring, the second node 415b may discard the received packet.

In action 520, the first node 415a transmits a unicast packet having the destination identifier U3 determined in block 514 to the third node 415c.

In block 522, the third node 415c receives and processes the unicast packet in response to identifying the destination identifier U3. In this regard, the third node 415c may be configured to monitor for incoming packets having the destination identifier U3. If the destination identifier of the received packet is equal to U3, the third node 415c passes the packet to higher layer(s) of the protocol stack for further processing. If the destination identifier of the received packet is not equal to U3, and is not equal to any other destination identifiers that the third node 415c is monitoring, the third node 415c may discard the received packet. For example, if the third node 415c receives a unicast packet having the unicast destination identifier U2 instead of U3, the third node 415c discards the unicast packet.

Figure 6:
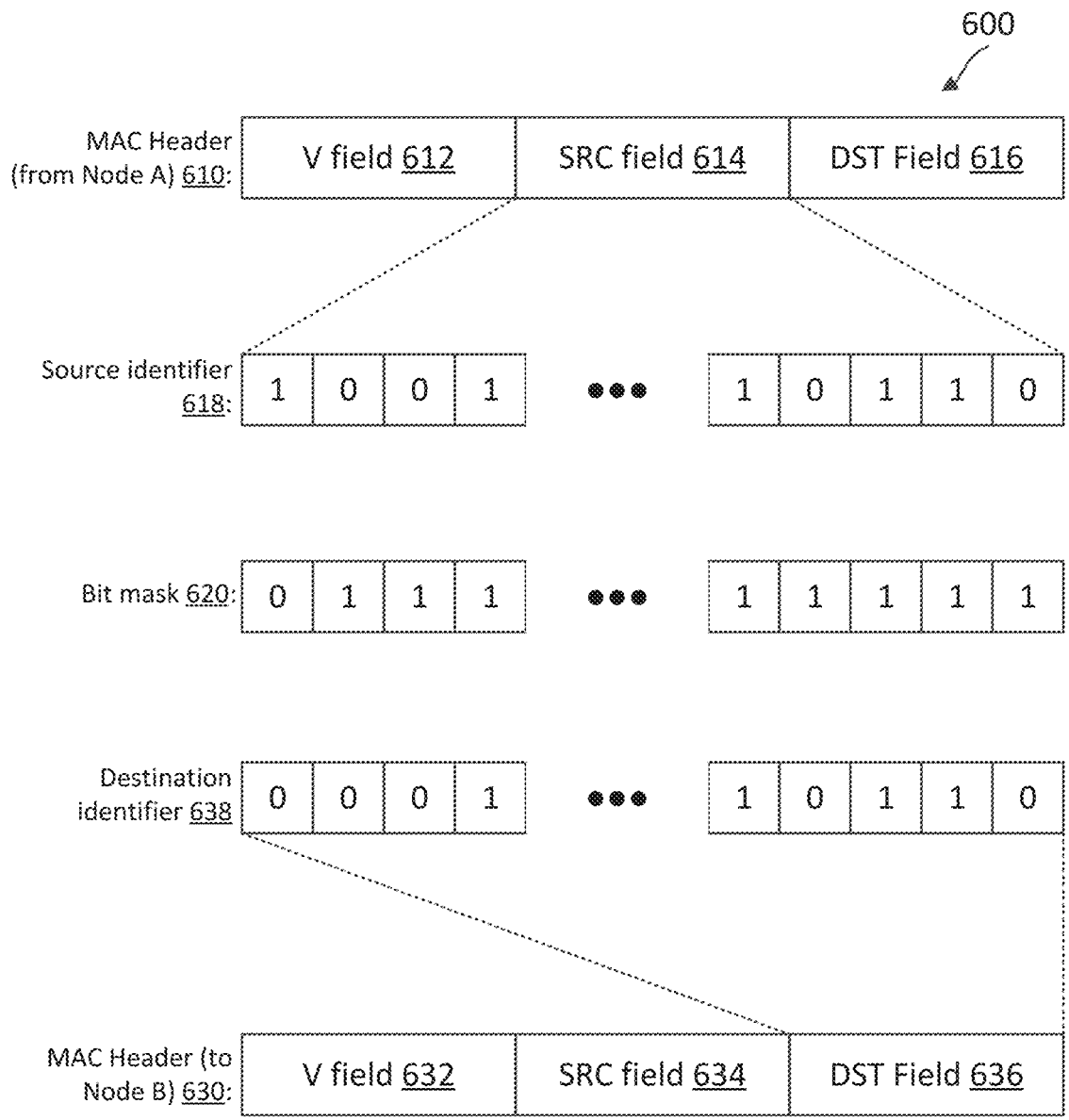
FIG. 6 is a diagram illustrating a method for generating a destination identifier using a deterministic function, according to some aspects of the present disclosure.

FIG. 6 is a diagram illustrating a method 600 for generating a destination identifier based on a source identifier and a deterministic function, according to some aspects of the present disclosure. Steps of the method 600 can be executed by computing devices (e.g., a processor, processing circuit, and/or other suitable component) of a wireless node, such as one of the UEs 115 (e.g., 115i, 115j, 115k) shown in FIG. 1, or one of the nodes 315, 415 shown in FIGS. 3-5. The steps of the method 600 may be performed at a data link layer or sublayer of a wireless node, such as the MAC layer. As illustrated, the method 600 includes a number of enumerated steps, but aspects of the method 600 may include additional steps before, after, and in between the enumerated steps.

A wireless node (e.g., Node B) may receive, from another node (e.g., Node A), a packet including a header, such as a MAC PDU header 610, which includes a V field 612, an SRC field 614, and a DST field 616. The SRC field 614 carries a source identifier 618, which has a plurality of bits defining a value. As explained above, the V field 612 may carry a version number identifier indicating one or more aspects of the packet, such as the size of the DST field 616. In an exemplary aspect, the SRC field 614 and the source identifier 618 are each a 24-bit value. The source identifier 618 may be randomly assigned, in some aspects. In other aspects, the source identifier 618 may be non-randomly assigned based on one or more system parameters.

A bit mask 620 may be used as a deterministic function to generate a destination identifier 638 based on the source identifier 618, which is carried by the SRC field 614. In the illustrated embodiment, the bit mask comprises a most significant bit (MSB) having a value of zero, and the remainder of the bits have a value of 1. In some aspects, the bit mask 620 may be expressed in hexadecimal notation as 0x7FFFFF. The zero value of the MSB may be used to indicate a unicast destination in a destination identifier, as explained below, while the remainder of the bits of the bit mask 620 leave corresponding bits of the source identifier 618 unchanged. However, these particular configurations are not limiting and could be modified in various ways without departing from the scope of the present disclosure.

The destination identifier 638 is determined by applying the bit mask 620 to the source identifier 618. In one aspect, the bit mask 620 is applied using a logical AND operation. Accordingly, as illustrated in FIG. 6, the MSB of the destination identifier 638 is different from the source identifier 618, while the remainder of the bits of the destination identifier 638 match the corresponding bits of the source identifier 618. It will be understood that allocating bits of the destination identifier 638 to indicate whether the packet is a unicast packet or a multicast packet may increase the chance that a packet is inadvertently received by another node within a range of the transmitting node. In this regard, in a scenario where the source identifier 618 is randomly assigned, it is possible, though improbable, that more than one node within the range of the transmitting node have source identifiers that share a sequence of bits. Thus, allocating one bit of the destination identifier 638 for indicating unicast/multicast destinations may effectively double the chance of collisions or unintended receptions. In that regard, it may be desirable to use few bits, or a single bit, to indicate whether the destination of a packet is unicast or multicast to minimize the chance of an inadvertent unicast transmission.

In some aspects, a destination identifier MSB value of 0 may indicate a multicast destination/transmission, and a destination identifier MSB value of 1 may indicate a unicast destination/transmission. In some aspects, more than one bit of the destination identifier 638 may be used to indicate the type of transmission (e.g., unicast, multicast). For example, in some aspects, the first two, three, four, or more bits of the destination identifier 638 may be used to indicate different types of destinations or transmissions. Described differently, the bit mask 620 may divide the number of possible values for a destination identifier into two groups: a first group in which the first bit is a zero (0x000000-0x7FFFFF), and a second group in which the first bit is a one (0x800000-0xFFFFFF). Each group may correspond either to a unicast destination, or a multicast destination.

With continued reference to FIG. 6, Node B prepares a packet having a MAC header 630. Like the MAC header 610 of the packet received from Node A, the MAC header 630 includes a V field 632, an SRC field 634, and a DST field 636. In a C-V2X scenario, the V field 632 may carry a same value as the V field 612. The SRC field 634 carries a source identifier associated with Node B. The source identifier may be randomly assigned, or assigned based on parameters specific to Node B. The DST field 636 carries the destination identifier 638. As explained above, the MSB may indicate whether the destination is a unicast destination or a multicast destination, while the remainder of the bits of the destination identifier 638 indicate the value of the intended recipient. The remainder of the bits may correspond to a portion of the bits of the source identifier of the intended recipient, for example.

Figure 7:
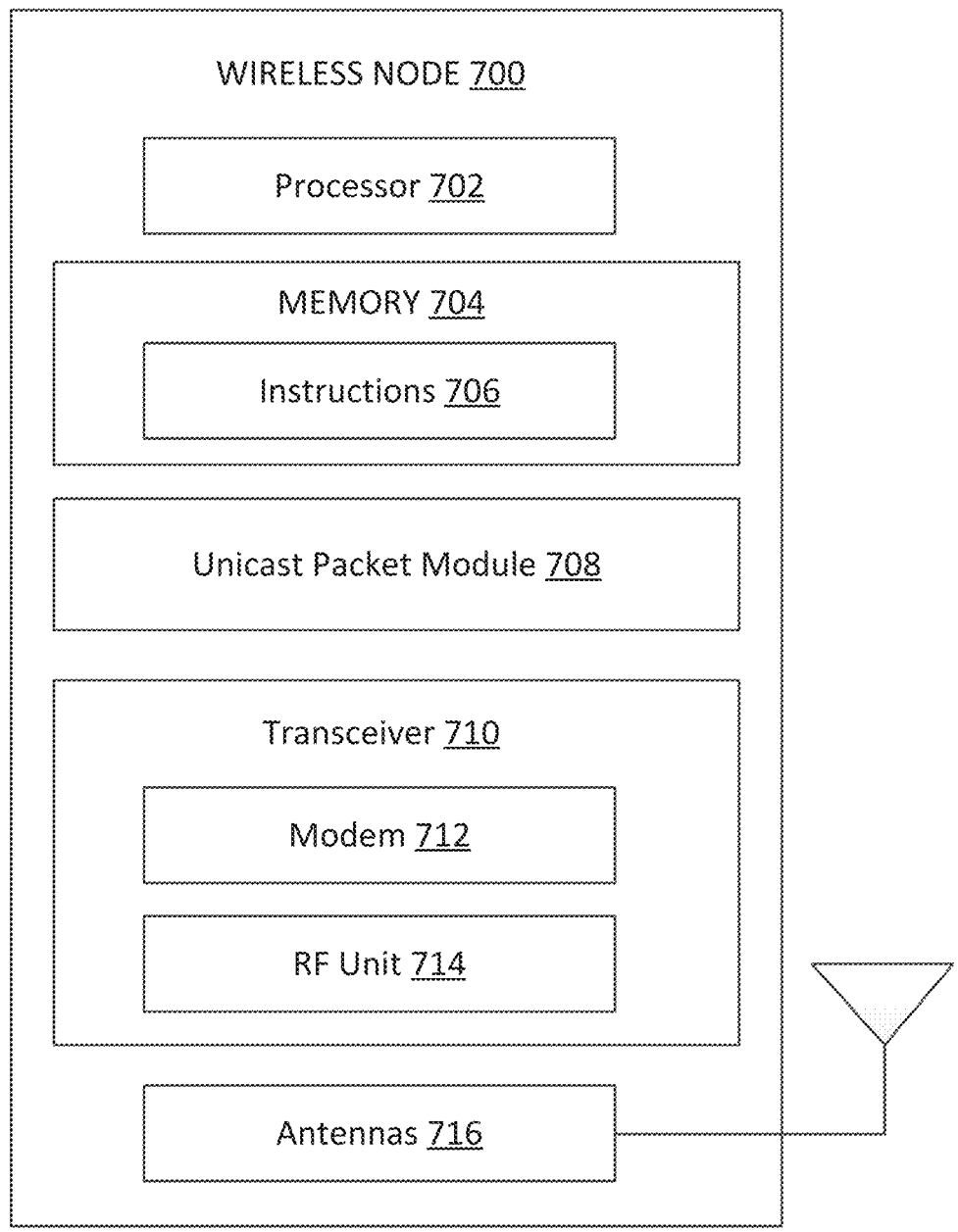
FIG. 7 is a block diagram of an exemplary wireless node according to some aspects of the present disclosure.

FIG. 7 is a block diagram of an exemplary wireless node 700 according to some aspects of the present disclosure. The node 700 may be a UE 115 in the network 100 (e.g., 115*i*, 115*j*, 115*k*) as discussed above in FIG. 1, a node 315 in the C-V2X communication scenario 300 as discussed above in FIG. 3, and/or a node 415 from the communication scenarios 400, 500 shown in FIGS. 4 and 5. As shown, the node 700 may include a processor 702, a memory 704, a unicast packet module 708, a transceiver 710 including a modem subsystem 712 and an RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-10 and 14. Instructions 706 may also be referred to as code, which may be interpreted broadly to include any type of computer-readable statement (s) as discussed above.

The unicast packet module 708 may be implemented via hardware, software, or combinations thereof. For example, the unicast packet module 708 may be implemented as a processor, circuit, and/or instructions 706 stored in the memory 704 and executed by the processor 702. In some instances, the unicast packet module 708 can be integrated within the modem subsystem 712. For example, the unicast packet module 708 can be implemented by a combination of software components (e.g., executed by a DSP or a general processor) and hardware components (e.g., logic gates and circuitry) within the modem subsystem 712. In some aspects, the unicast packet module 708 may be employed in a data link layer of a wireless communication node, such as a MAC layer The unicast packet module 708 may communicate with various components of a wireless node (e.g., 315, 415) to perform various aspects of the present disclosure, for example, aspects of FIGS. 3-6, 8, and 9. For instance, the unicast packet module 708 may be configured to generate a unicast and/or a multicast packet for transmission to another wireless node in accordance with the present disclosure. Further, in some instances the unicast packet module 708 may be configured to process a packet received from another wireless node to determine whether the packet is intended for the wireless node 700. For example, the unicast packet module may determine the packet is intended for the wireless node when a unicast packet is intended for the wireless node 700 (e.g., when the packet includes an indication that the packet is a unicast packet and an identifier associated with the wireless node 700) or a multicast packet intended for a group of wireless nodes including wireless node 700. In some aspects, the unicast packet module 708 may be configured to receive a source identifier associated with a second wireless communication device. The unicast packet module 708 may be further configured to determine, based on the source identifier associated with the second wireless communication device and a deterministic function, a destination identifier. The destination identifier may be associated with an individual node, in some aspects. The unicast packet module 708 may be further configured to generate a unicast packet comprising the destination identifier and cause the wireless node 700 to transmit the unicast packet to the second wireless communication device.

In another aspect, the unicast packet module 708 may be configured to determine, based on a source identifier associated with a first wireless communication device and a deterministic function, a destination identifier associated with the first wireless communication device. The unicast packet module 708 may be further configured to process a packet received by the wireless node 700 from a second wireless communication device to determine whether the packet is a unicast packet based on whether the packet comprises the destination identifier.

As shown, the transceiver 710 may include the modem subsystem 712 and the RF unit 714. The transceiver 710 can be configured to communicate bi-directionally with other devices, such as other nodes in the sidelink communication scheme. The modem subsystem 712 may be configured to modulate and/or encode data according to a MCS, e.g., a LDPC coding scheme, a turbo coding scheme, a convolutional coding scheme, a polar coding scheme, a digital beamforming scheme, etc. The RF unit 714 may be configured to process (e.g., perform analog to digital conversion or digital to analog conversion, etc.) modulated/encoded data (e.g., MAC PDU, source identifiers, destination identifier, header version numbers, static mapping configuration information for static mapping (e.g., lookup tables) and/or hash operations) from the modem subsystem 712 (on outbound transmissions) or of transmissions originating from another source such as a wireless node 315, 415, 700. The RF unit 714 may be further configured to perform analog beamforming in conjunction with the digital beamforming. Although shown as integrated together in transceiver 710, the modem subsystem 712 and/or the RF unit 714 may be separate devices that are coupled together at the wireless node to enable the wireless node to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., basic safety messages (BSMs), MAC PDU, source identifiers, destination identifier, header version numbers, static mapping configuration information for static mapping (e.g., lookup tables) and/or hash operations) to the unicast packet module 708 for processing. The antennas 716 may include multiple antennas of similar or different designs in order to sustain multiple transmission links.

In an aspect, the wireless node 700 can include multiple transceivers 710 implementing different RATs (e.g., NR and LTE). In an aspect, the node 700 can include a single transceiver 710 implementing multiple RATs (e.g., NR and LTE). In an aspect, the transceiver 710 can include various components, where different combinations of components can implement different RATs.

Figure 8:
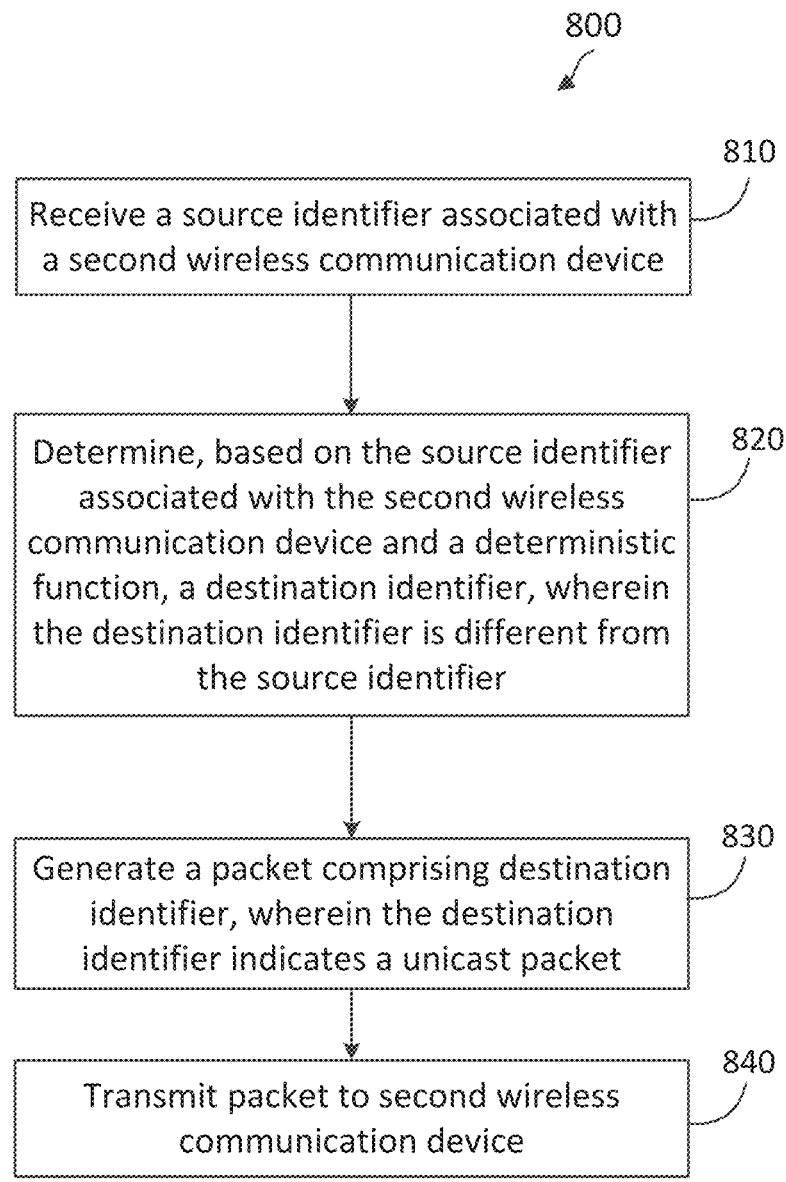
FIG. 8 is a flow diagram of a C-V2X sidelink communication method according to some aspects of the present disclosure.

FIG. 8 is a flow diagram of a communication method 800 according to some aspects of the present disclosure. Aspects of the method 800 can be executed by a first wireless communication device, such as one of the UEs 115 shown in FIG. 1 (e.g., 115i, 115j, 115k), and/or one of the nodes 315, 415 shown in FIGS. 3-5, and/or the node 700 illustrated in FIG. 7. A node may comprise a processor, processing circuit, and/or any other suitable component or means for performing the steps. For example, the node 700 may utilize one or more components, such as the processor 702, the memory 704, the unicast packet module 708, the transceiver 710, the modem 712, and the one or more antennas 716, to execute the steps of method 800. The method 800 may employ similar mechanisms as in the schemes 300, 400, 500, and 600 discussed above with respect to FIGS. 3-6. Aspects of the method 800 may be employed in a data link layer of a wireless communication node, such as a MAC layer. As illustrated, the method 800 includes a number of enumerated steps, but aspects of the method 800 may include additional steps before, after, and in between the enumerated steps. In some aspects, one or more of the enumerated steps may be omitted or performed in a different order.

In block 810, the first wireless communication device receives a source identifier associated with a second wireless communication device. The source identifier may be received in a packet transmitted from the second wireless communication device. In particular, the packet may include a header having an SRC field, where the source identifier is set as the SRC field value. Accordingly, receiving the source identifier may include receiving a packet from the second wireless communication device, wherein the packet includes the source identifier associated with the second wireless communication device. The source identifier may be a randomly-generated value comprising a plurality of bits. In an exemplary aspect, the source identifier is a 24-bit value generated by the second wireless communication device. In some aspects, the first wireless communication device may utilize one or more components, such as the processor 702, the memory 704, the unicast packet module 708, the transceiver 710, the modem 712, and/or the one or more antennas 716, to perform the operations of block 810.

In block 820, the first wireless communication device determines, based on the source identifier associated with the second wireless communication device and a deterministic function, a destination identifier. In some aspects, the destination identifier is different from the source identifier. In some aspects, the destination identifier is associated with a single or individual node. For example, the destination identifier may be associated with the second wireless communication device. In some aspects, the deterministic function comprises at least one of a bit masking operation, a static mapping operation, or a hash operation. In some aspects, the source identifier is associated with a first number of possible values, and the destination identifier is associated with a second number of possible values smaller than the first number of possible values. In some aspects, the first wireless communication device may utilize one or more components, such as the processor 702, the memory 704, and/or the unicast packet module 708, to perform the operations of block 820.

In block 830, the first wireless communication device generates a packet comprising the destination identifier. In some aspects, the destination identifier indicates a unicast packet. In some aspects, generating the packet includes generating a media access control (MAC) header, wherein the MAC header includes the destination identifier. In some aspects, the MAC header further includes a source identifier associated with the first wireless communication device. In another aspect, the destination identifier comprises a first plurality of bits, wherein at least a first bit of the first plurality of bits indicates that the packet is associated with a unicast transmission type. In another aspect, the source identifier associated with the second wireless communication device includes a second plurality of bits, and a portion of the first plurality of bits corresponds to a portion of the second plurality of bits. In some aspects, the first wireless communication device may utilize one or more components, such as the processor 702, the memory 704, the unicast packet module 708, the transceiver 710, the modem 712, and the one or more antennas 716, to perform the operations of block 830.

In block 840, the first wireless communication device transmits the packet to the second wireless communication device. In one aspect, transmitting the packet to the second wireless communication device includes transmitting the unicast using long-term evolution vehicle-to-everything (LTE-V2X) sidelink communication. In some aspects, the first wireless communication device may utilize one or more components, such as the processor 702, the memory 704, the unicast packet module 708, the transceiver 710, the modem 712, and the one or more antennas 716, to perform the operations of block 840.

Figure 9:
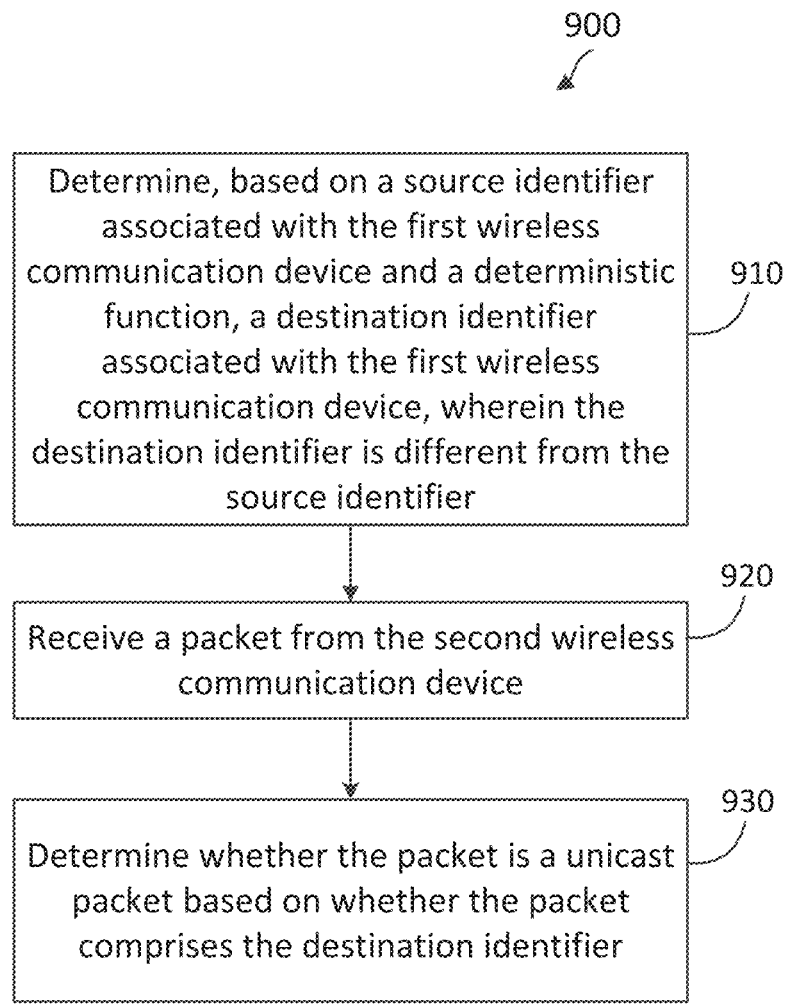
FIG. 9 is a flow diagram of a C-V2X sidelink communication method according to some aspects of the present disclosure.

FIG. 9 is a flow diagram of a communication method 900 according to some aspects of the present disclosure. Aspects of the method 900 can be executed by a first wireless communication device, such as one of the UEs 115 shown in FIG. 1 (e.g., 115i, 115j, 115k), one of the nodes 315, 415 shown in FIGS. 3-5, and/or the node 700 shown in FIG. 7. A node may comprise a processor, processing circuit, and/or any other suitable component or means for performing the steps. For example, the node 700 may utilize one or more components, such as the processor 702, the memory 704, the unicast packet module 708, the transceiver 710, the modem 712, and the one or more antennas 716, to execute the steps of method 900. The method 900 may employ similar mechanisms as in the schemes 300, 400, 500, and 600 discussed above with respect to FIGS. 3-6. Aspects of the method 900 may be employed in a data link layer of a wireless communication node, such as a MAC layer. As illustrated, the method 900 includes a number of enumerated steps, but aspects of the method 900 may include additional steps before, after, and in between the enumerated steps. In some aspects, one or more of the enumerated steps may be omitted or performed in a different order.

In block 910, the first wireless communication device determines, based on a source identifier associated with the first wireless communication device and a deterministic function, a destination identifier associated with the first wireless communication device. In some aspects, the destination identifier is different from the source identifier. In some aspects, the deterministic function comprises at least one of a bit masking operation, a static mapping operation, or a hash operation. In some aspects, the source identifier is associated with a first number of possible values, and the destination identifier is associated with a second number of possible values smaller than the first number of possible values. In another aspect, the destination identifier comprises a first plurality of bits, wherein at least a first bit of the first plurality of bits indicates that the packet is a unicast packet. In another aspect, the source identifier associated with the first wireless communication device includes a second plurality of bits, and a portion of the first plurality of bits corresponds to a portion of the second plurality of bits. In some aspects, the first wireless communication device may utilize one or more components, such as the processor 702, the memory 704, the unicast packet module 708, the transceiver 710, the modem 712, and the one or more antennas 716, to perform the operations of block 910.

In block 920, the first wireless communication device receives a packet from a second wireless communication device comprising the destination identifier. In some aspects, receiving the packet includes receiving a media access control (MAC) header. In some aspects, the MAC header includes a source identifier associated with the first wireless communication device. In some aspects, the first wireless communication device may utilize one or more components, such as the processor 702, the memory 704, the unicast packet module 708, the transceiver 710, the modem 712, and the one or more antennas 716, to perform the operations of block 920.

In block 930, the first wireless communication device determines whether the packet is a unicast packet intended for the first wireless communication device based on whether the packet comprises the destination identifier. In some aspects, receiving the packet from the second wireless communication device includes receiving the packet using long-term evolution vehicle-to-everything (LTE-V2X) sidelink communication. In some aspects, the first wireless communication device may utilize one or more components, such as the processor 702, the memory 704, the unicast packet module 708, the transceiver 710, the modem 712, and the one or more antennas 716, to perform the operations of block 930.

In one aspect, the method 900 further includes forwarding the packet received in block 920 to a higher layer of the first wireless communication device in response to determining that the packet includes the destination identifier determined in block 910. In another aspect, the method 900 further includes discarding the packet received in block 920 in response to determining that the packet does not include the destination identifier determined in block 910.

The present disclosure also includes the following aspects:

1. A method for wireless communication performed by a first wireless communication device, comprising:
  receiving a source identifier associated with a second wireless communication device;
  determining, based on the source identifier associated with the second wireless communication device and a deterministic function, a destination identifier, wherein the destination identifier is different from the source identifier;
  generating a packet comprising the destination identifier, wherein the destination identifier indicates a unicast packet; and
  transmitting the packet to the second wireless communication device.

2. The method of clause 1, wherein the deterministic function comprises at least one of a bit masking operation, a static mapping operation, or a hash operation.

3. The method of any of clauses 1-2, wherein the source identifier is associated with a first number of possible values, and wherein the destination identifier is associated with a second number of possible values smaller than the first number of possible values.

4. The method of any of clauses 1-3, wherein the destination identifier comprises a first plurality of bits, and wherein at least a first bit of the first plurality of bits indicates that the packet is associated with a unicast transmission type.

5. The method of clause 4, wherein the source identifier associated with the second wireless communication device comprises a second plurality of bits, and wherein a portion of the first plurality of bits corresponds to a portion of the second plurality of bits.

6. The method of any of clauses 1-5, wherein the receiving the source identifier associated with the second wireless communication device comprises:
  receiving a packet from the second wireless communication device, wherein the packet comprises the source identifier associated with the second wireless communication device.

7. The method of any of clauses 1-6, wherein the generating the packet comprises generating a media access control (MAC) header, wherein the MAC header comprises the destination identifier.

8. The method of clause 7, wherein the MAC header further comprises a source identifier associated with the first wireless communication device.

9. The method of any of clauses 1-8, wherein the transmitting the packet to the second wireless communication device comprises transmitting the packet using long-term evolution (LTE) vehicle-to-everything (V2X) sidelink communication.

10. A method for wireless communication performed by a first wireless communication device, comprising:
  determining, based on a source identifier associated with the first wireless communication device and a deterministic function, a destination identifier, wherein the destination identifier is different from the source identifier associated with the first wireless communication device;
  receiving a packet from a second wireless communication device; and
  determining whether the packet is a unicast packet based on whether the packet comprises the destination identifier.

11. The method of clause 10, wherein the deterministic function comprises at least one of a bit masking operation, a static mapping operation, or a hash operation.

12. The method of any of clauses 10-11, wherein the source identifier is associated with a first number of possible values, and wherein the destination identifier is associated with a second number of possible values smaller than the first number of possible values.

13. The method of any of clauses 10-12, wherein the destination identifier comprises a first plurality of bits, and wherein at least a first bit of the first plurality of bits indicates that the packet is associated with a unicast transmission type.

14. The method of clause 13, wherein the source identifier associated with the first wireless communication device comprises a second plurality of bits, and wherein a portion of the first plurality of bits corresponds to a portion of the second plurality of bits.

15. The method of any of clauses 10-14, further comprising:
transmitting a further packet, wherein the further packet comprises the source identifier associated with the first wireless communication device.

16. The method of any of clauses 10-14, wherein the receiving the packet from the second wireless communication device comprises receiving a media access control (MAC) header.

17. The method of clause 16, wherein the MAC header comprises a second source identifier associated with the second wireless communication device.

18. The method of any of clauses 10-17, further comprising:
forwarding the packet to a higher layer of the first wireless communication device in response to determining that the packet comprises the destination identifier.

19. The method of any of clauses 10-17, further comprising:
discarding the packet in response to determining that the packet does not comprise the destination identifier.

20. The method of any of clauses 10-19, wherein receiving the packet from the second wireless communication device comprises receiving the packet using long-term evolution (LTE) vehicle-to-everything (V2X) sidelink communication.

21. A first wireless communication device, comprising:
a transceiver configured to:
receive a source identifier associated with a second wireless communication device;
and
a processor in communication with the processor, the transceiver configured to:
determine, based on the source identifier associated with the second wireless communication device and a deterministic function, a destination identifier, wherein the destination identifier is different from the source identifier; and
generate a packet comprising the destination identifier, wherein the destination identifier indicates a unicast packet,
wherein the transceiver is further configured to:
transmit the packet to the second wireless communication device.

22. The first wireless communication device of clause 21, wherein the deterministic function comprises at least one of a bit masking operation, a static mapping operation, or a hash operation.

23. The first wireless communication device of any of clauses 21-22, wherein the source identifier is associated with a first number of possible values, and wherein the destination identifier is associated with a second number of possible values smaller than the first number of possible values.

24. The first wireless communication device of any of clauses 21-23, wherein the destination identifier comprises a first plurality of bits, and wherein at least a first bit of the first plurality of bits indicates that the packet is associated with a unicast transmission type.

25. The first wireless communication device of clause 24, wherein the source identifier associated with the second wireless communication device comprises a second plurality of bits, and wherein a portion of the first plurality of bits corresponds to a portion of the second plurality of bits.

26. The first wireless communication device of any of clauses 21-25, wherein the transceiver configured to receive the source identifier associated with the second wireless communication device comprises the transceiver configured to:
receive a packet from the second wireless communication device, wherein the packet comprises the source identifier associated with the second wireless communication device.

27. The first wireless communication device of any of clauses 21-26, wherein the processor configured to generate the packet comprises the processor configured to:
generate a media access control (MAC) header, wherein the MAC header comprises the destination identifier.

28. The first wireless communication device of clause 27, wherein the MAC header further comprises a source identifier associated with the first wireless communication device.

29. The first wireless communication device of any of clauses 21-28, wherein the transceiver configured to transmit the packet to the second wireless communication device comprises the transceiver configured to:
transmit the packet using long-term evolution (LTE) vehicle-to-everything (V2X) sidelink communication.

30. A first wireless communication device, comprising:
a processor configured to:
determine, based on a source identifier associated with the first wireless communication device and a deterministic function, a destination identifier, wherein the destination identifier is different from the source identifier associated with the first wireless communication device; and
a transceiver configured to:
receive a packet from a second wireless communication device,
wherein the processor is further configured to:
determine whether the packet is a unicast packet based on whether the packet comprises the destination identifier.

31. The first wireless communication device of clause 30, wherein the deterministic function comprises at least one of a bit masking operation, a static mapping operation, or a hash operation.

32. The first wireless communication device of any of clauses 30-31, wherein the source identifier is associated with a first number of possible values, and wherein the destination identifier is associated with a second number of possible values smaller than the first number of possible values.

33. The first wireless communication device of any of clauses 30-32, wherein the destination identifier comprises a first plurality of bits, and wherein at least a first bit of the first plurality of bits indicates that the packet is associated with a unicast transmission type.

34. The first wireless communication device of clause 33, wherein the source identifier associated with the first wireless communication device comprises a second plurality of bits, and wherein a portion of the first plurality of bits corresponds to a portion of the second plurality of bits.

35. The first wireless communication device of any of clauses 30-34, wherein the transceiver is further configured to:
transmit a further packet, wherein the further packet comprises the source identifier associated with the first wireless communication device.

36. The first wireless communication device of any of clauses 30-35, wherein the transceiver configured to receive the packet from the second wireless communication device comprises the transceiver configured to:
receive a media access control (MAC) header.

37. The first wireless communication device of clause 36, wherein the MAC header comprises a second source identifier associated with the second wireless communication device.

38. The first wireless communication device of any of clauses 30-37, wherein the processor is further configured to:
forward the packet to a higher layer of the first wireless communication device in response to determining that the packet comprises the destination identifier.

39. The first wireless communication device of any of clauses 30-37, wherein the processor is further configured to:
discard the packet in response to determining that the packet does not comprise the destination identifier.

40. The first wireless communication device of any of clauses 30-39, wherein the transceiver configured to receive the packet from the second wireless communication device comprises the processor configured to:
receive the packet using long-term evolution (LTE) vehicle-to-everything (V2X) sidelink communication.

41. A non-transitory computer-readable medium having a program code recorded thereon for wireless communication by a first wireless communication device, the program code comprising:
code for causing the first wireless communication device to receive a source identifier associated with a second wireless communication device;
code for causing the first wireless communication device to determine, based on the source identifier associated with the second wireless communication device and a deterministic function, a destination identifier, wherein the destination identifier is different from the source identifier;
code for causing the first wireless communication device to generate a packet comprising the destination identifier, wherein the destination identifier indicates a unicast packet; and
code for causing the first wireless communication device to transmit the packet to the second wireless communication device.

42. The non-transitory computer-readable medium of clause 41, wherein the deterministic function comprises at least one of a bit masking operation, a static mapping operation, or a hash operation.

43. The non-transitory computer-readable medium of any of clauses 41-42, wherein the source identifier is associated with a first number of possible values, and wherein the destination identifier is associated with a second number of possible values smaller than the first number of possible values.

44. The non-transitory computer-readable medium of any of clauses 41-43, wherein the destination identifier comprises a first plurality of bits, and wherein at least a first bit of the first plurality of bits indicates that the packet is associated with a unicast transmission type.

45. The non-transitory computer-readable medium of clause 44, wherein the source identifier associated with the second wireless communication device comprises a second plurality of bits, and wherein a portion of the first plurality of bits corresponds to a portion of the second plurality of bits.

46. The non-transitory computer-readable medium of any of clauses 41-45, wherein the code for causing the first wireless communication device to receive the source identifier associated with the second wireless communication device comprises:
code for causing the first wireless communication device to receive a packet from the second wireless communication device, wherein the packet comprises the source identifier associated with the second wireless communication device.

47. The non-transitory computer-readable medium of any of clauses 41-46, wherein the code for causing the first wireless communication device to generate the packet comprises:
code for causing the first wireless communication device to generate a media access control (MAC) header, wherein the MAC header comprises the destination identifier.

48. The non-transitory computer-readable medium of clause 47, wherein the MAC header further comprises a source identifier associated with the first wireless communication device.

49. The non-transitory computer-readable medium of any of clauses 41-48, wherein the code for causing the first wireless communication device to transmit the packet to the second wireless communication device comprises:
code for causing the first wireless communication device to transmit the packet using long-term evolution (LTE) vehicle-to-everything (V2X) sidelink communication.

50. A non-transitory computer-readable medium having program code recorded thereon for wireless communication by a first wireless communication device, comprising:
code for causing the first wireless communication device to determine, based on a source identifier associated with the first wireless communication device and a deterministic function, a destination identifier, wherein the destination identifier is different from the source identifier associated with the first wireless communication device;
code for causing the first wireless communication device to receive a packet from a second wireless communication device; and code for causing the first wireless communication device to determine whether the packet is a unicast packet based on whether the packet comprises the destination identifier.
51. The non-transitory computer-readable medium of clause 50, wherein the deterministic function comprises at least one of a bit masking operation, a static mapping operation, or a hash operation.
52. The non-transitory computer-readable medium of any of clauses 50-51, wherein the source identifier is associated with a first number of possible values, and wherein the destination identifier is associated with a second number of possible values smaller than the first number of possible values.
53. The non-transitory computer-readable medium of any of clauses 50-52, wherein the destination identifier comprises a first plurality of bits, and wherein at least a first bit of the first plurality of bits indicates that the packet is associated with a unicast transmission type.
54. The non-transitory computer-readable medium of clause 53, wherein the source identifier associated with the first wireless communication device comprises a second plurality of bits, and wherein a portion of the first plurality of bits corresponds to a portion of the second plurality of bits.
55. The non-transitory computer-readable medium of any of clauses 50-54, wherein the program code further comprises:
code for causing the first wireless communication device to transmit a further packet, wherein the further packet comprises the source identifier associated with the first wireless communication device.
56. The non-transitory computer-readable medium of any of clauses 50-55, wherein the code for causing the first wireless communication device to receive the packet from the second wireless communication device comprises:
code for causing the first wireless communication device to receive a media access control (MAC) header.
57. The non-transitory computer-readable medium of clause 56, wherein the MAC header comprises a second source identifier associated with the second wireless communication device.
58. The non-transitory computer-readable medium of any of clauses 50-57, wherein the program code further comprises:
code for causing the first wireless communication device to forward the packet to a higher layer of the first wireless communication device in response to determining that the packet comprises the destination identifier.
59. The non-transitory computer-readable medium of any of clauses 50-57, wherein the program code further comprises:
code for causing the first wireless communication device to discard the packet in response to determining that the packet does not comprise the destination identifier.
60. The non-transitory computer-readable medium of any of clauses 50-59, wherein the code for causing the first wireless communication device to receive the packet from the second wireless communication device comprises:
code for causing the first wireless communication device to receive the packet using long-term evolution (LTE) vehicle-to-everything (V2X) sidelink communication.
61. A first wireless communication device, comprising:
means for receiving a source identifier associated with a second wireless communication device;
means for determining, based on the source identifier associated with the second wireless communication device and a deterministic function, a destination identifier, wherein the destination identifier is different from the source identifier;
means for generating a packet comprising the destination identifier, wherein the destination identifier indicates a unicast packet; and
means for transmitting the packet to the second wireless communication device.
62. The first wireless communication device of clause 61, wherein the deterministic function comprises at least one of a bit masking operation, a static mapping operation, or a hash operation.
63. The first wireless communication device of any of clauses 61-62, wherein the source identifier is associated with a first number of possible values, and wherein the destination identifier is associated with a second number of possible values smaller than the first number of possible values.
64. The first wireless communication device of any of clauses 61-63, wherein the destination identifier comprises a first plurality of bits, and wherein at least a first bit of the first plurality of bits indicates that the packet is associated with a unicast transmission type.
65. The first wireless communication device of clause 64, wherein the source identifier associated with the second wireless communication device comprises a second plurality of bits, and wherein a portion of the first plurality of bits corresponds to a portion of the second plurality of bits.
66. The first wireless communication device of any of clauses 61-65, wherein the means for receiving the source identifier associated with the second wireless communication device comprises:
means for receiving a packet from the second wireless communication device, wherein the packet comprises the source identifier associated with the second wireless communication device.
67. The first wireless communication device of any of clauses 61-66, wherein the means for generating the packet comprises:
means for generating a media access control (MAC) header, wherein the MAC header comprises the destination identifier.
68. The first wireless communication device of clause 67, wherein the MAC header further comprises a source identifier associated with the first wireless communication device.
69. The first wireless communication device of any of clauses 61-68, wherein the means for transmitting the packet to the second wireless communication device comprises:
means for transmitting the packet using long-term evolution (LTE) vehicle-to-everything (V2X) sidelink communication.
70. A first wireless communication device, comprising:
means for determining, based on a source identifier associated with the first wireless communication device and a deterministic function, a destination identifier, wherein the destination identifier is different from the source identifier associated with the first wireless communication device;
  means for receiving a packet from a second wireless communication device; and
  means for determining whether the packet is a unicast packet based on whether the packet comprises the destination identifier.
71. The first wireless communication device of clause 70, wherein the deterministic function comprises at least one of a bit masking operation, a static mapping operation, or a hash operation.
72. The first wireless communication device of any of clauses 70-71, wherein the source identifier is associated with a first number of possible values, and wherein the destination identifier is associated with a second number of possible values smaller than the first number of possible values.
73. The first wireless communication device of any of clauses 70-72, wherein the destination identifier comprises a first plurality of bits, and wherein at least a first bit of the first plurality of bits indicates the unicast destination.
74. The first wireless communication device of clause 73, wherein the source identifier associated with the first wireless communication device comprises a second plurality of bits, and wherein a portion of the first plurality of bits corresponds to a portion of the second plurality of bits.
75. The first wireless communication device of any of clauses 70-74, further comprising:
  means for transmitting a further packet, wherein the further packet comprises the source identifier associated with the first wireless communication device.
76. The first wireless communication device of any of clauses 70-75, wherein the means for receiving the packet from the second wireless communication device comprises:
  means for receiving a media access control (MAC) header.
77. The first wireless communication device of clause 76, wherein the MAC header comprises a second source identifier associated with the second wireless communication device.
78. The first wireless communication device of any of clauses 70-77, further comprising:
  means for forwarding the packet to a higher layer of the first wireless communication device in response to determining that the packet comprises the destination identifier.
79. The first wireless communication device of any of clauses 70-77, further comprising:
  means for discarding the packet in response to determining that the packet does not comprise the destination identifier.
80. The first wireless communication device of any of clauses 70-79, wherein means for receiving the packet from the second wireless communication device comprises:
  means for receiving the packet using long-term evolution (LTE) vehicle-to-everything (V2X) sidelink communication.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:
1. A method for wireless communication performed by a first wireless communication device, comprising:
  receiving a source identifier associated with a second wireless communication device;
  determining, based on the source identifier associated with the second wireless communication device and a deterministic function, a destination identifier associated with the second wireless communication device, wherein the destination identifier is different from the source identifier, wherein the destination identifier comprises a first plurality of bits and the source identifier comprises a second plurality of bits, wherein the first plurality of bits is the same number of bits as the second plurality of bits, wherein at least one bit of the destination identifier indicates a unicast packet type, and wherein at least a portion of the first plurality of bits corresponds to a portion of the second plurality of bits;
  generating a packet comprising the destination identifier; and
  transmitting the packet to the second wireless communication device.

2. The method of claim 1, wherein the deterministic function comprises at least one of a bit masking operation, a static mapping operation, or a hash operation.

3. The method of claim 1, wherein the source identifier is associated with a first number of possible values, and wherein the destination identifier is associated with a second number of possible values smaller than the first number of possible values.

4. The method of claim 1, wherein at least a first bit of the first plurality of bits indicates that the packet is associated with the unicast transmission type.

5. The method of claim 1, wherein the receiving the source identifier associated with the second wireless communication device comprises:
receiving a packet from the second wireless communication device, wherein the packet comprises the source identifier associated with the second wireless communication device.

6. The method of claim 1, wherein the generating the packet comprises generating a media access control (MAC) header, wherein the MAC header comprises the destination identifier.

7. The method of claim 6, wherein the MAC header further comprises a source identifier associated with the first wireless communication device.

8. The method of claim 1, wherein the transmitting the packet to the second wireless communication device comprises transmitting the packet using long-term evolution (LTE) vehicle-to-everything (V2X) sidelink communication.

9. A method for wireless communication performed by a first wireless communication device, comprising:
determining, based on a source identifier associated with the first wireless communication device and a deterministic function, a destination identifier associated with the first wireless communication device, wherein the destination identifier is different from the source identifier, wherein the destination identifier comprises a first plurality of bits and the source identifier comprises a second plurality of bits, wherein the first plurality of bits is the same number of bits as the second plurality of bits, wherein at least one bit of the destination identifier indicates a unicast packet type, and wherein at least a portion of the first plurality of bits corresponds to a portion of the second plurality of bits;
receiving a packet from a second wireless communication device; and
determining whether the packet is a unicast packet based on whether the packet comprises the destination identifier.

10. The method of claim 9, wherein the deterministic function comprises at least one of a bit masking operation, a static mapping operation, or a hash operation.

11. The method of claim 9, wherein the source identifier is associated with a first number of possible values, and wherein the destination identifier is associated with a second number of possible values smaller than the first number of possible values.

12. The method of claim 9, wherein:
at least a first bit of the first plurality of bits indicates that the packet is associated with the unicast transmission type.

13. The method of claim 9, further comprising:
transmitting a further packet, wherein the further packet comprises the source identifier associated with the first wireless communication device.

14. The method of claim 9, wherein the receiving the packet from the second wireless communication device comprises receiving a media access control (MAC) header, wherein the MAC header comprises a second source identifier associated with the second wireless communication device.

15. The method of claim 9, further comprising:
forwarding the packet to a higher layer of the first wireless communication device in response to determining that the packet comprises the destination identifier.

16. The method of claim 9, further comprising:
discarding the packet in response to determining that the packet does not comprise the destination identifier.

17. A first wireless communication device, comprising:
a transceiver configured to:
receive a source identifier associated with a second wireless communication device;
and
a processor in communication with the processor, the processor configured to:
determine, based on the source identifier associated with the second wireless communication device and a deterministic function, a destination identifier associated with the second wireless communication device, wherein the destination identifier is different from the source identifier, wherein the destination identifier comprises a first plurality of bits and the source identifier comprises a second plurality of bits, wherein the first plurality of bits is the same number of bits as the second plurality of bits, wherein at least one bit of the destination identifier indicates a unicast packet type, and wherein at least a portion of the first plurality of bits corresponds to a portion of the second plurality of bits; and
generate a packet comprising the destination identifier,
wherein the transceiver is further configured to:
transmit the packet to the second wireless communication device.

18. The first wireless communication device of claim 17, wherein the deterministic function comprises at least one of a bit masking operation, a static mapping operation, or a hash operation.

19. The first wireless communication device of claim 17, wherein the source identifier is associated with a first number of possible values, and wherein the destination identifier is associated with a second number of possible values smaller than the first number of possible values.

20. The first wireless communication device of claim 17, wherein:
at least a first bit of the first plurality of bits indicates that the packet is associated with the unicast transmission type.

21. The first wireless communication device of claim 17, wherein the transceiver configured to receive the source identifier associated with the second wireless communication device comprises the transceiver configured to:
receive a packet from the second wireless communication device, wherein the packet comprises the source identifier associated with the second wireless communication device.

22. The first wireless communication device of claim 17, wherein the processor configured to generate the packet comprises the processor configured to:
generate a media access control (MAC) header, wherein the MAC header comprises:
the destination identifier; and a source identifier associated with the first wireless communication device.

23. A first wireless communication device, comprising:
a processor configured to:
determine, based on a source identifier associated with the first wireless communication device and a deterministic function, a destination identifier associated with the first wireless communication device, wherein the destination identifier is different from the source identifier, wherein the destination identifier comprises a first plurality of bits and the source identifier comprises a second plurality of bits, wherein the first plurality of bits is the same number of bits as the second plurality of bits, wherein at least one bit of the destination identifier indicates a unicast packet type, and wherein at least a portion of the first plurality of bits corresponds to a portion of the second plurality of bits; and
a transceiver configured to:
receive a packet from a second wireless communication device, wherein the processor is further configured to:
determine whether the packet is a unicast packet based on whether the packet comprises the destination identifier.

24. The first wireless communication device of claim 23, wherein the deterministic function comprises at least one of a bit masking operation, a static mapping operation, or a hash operation.

25. The first wireless communication device of claim 23, wherein:
at least a first bit of the first plurality of bits indicates that the packet is associated with a unicast transmission type.

26. The first wireless communication device of claim 23, wherein the transceiver is further configured to:
transmit a further packet, wherein the further packet comprises the source identifier associated with the first wireless communication device.

27. The first wireless communication device of claim 23, wherein the transceiver configured to receive the packet from the second wireless communication device comprises the transceiver configured to:
receive a media access control (MAC) header, wherein the MAC header comprises a second source identifier associated with the second wireless communication device.

28. The first wireless communication device of claim 23, wherein the processor is further configured to:
forward the packet to a higher layer of the first wireless communication device in response to determining that the packet comprises the destination identifier.

29. The first wireless communication device of claim 23, wherein the processor is further configured to:
discard the packet in response to determining that the packet does not comprise the destination identifier.

* * * * *